(12) United States Patent
Kawasaki et al.

(10) Patent No.: US 11,525,776 B2
(45) Date of Patent: Dec. 13, 2022

(54) DROPLET SENSOR

(71) Applicants: Yuya Kawasaki, Tokyo (JP); Hideo Kurosawa, Kanagawa (JP)

(72) Inventors: Yuya Kawasaki, Tokyo (JP); Hideo Kurosawa, Kanagawa (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 264 days.

(21) Appl. No.: 16/503,862

(22) Filed: Jul. 5, 2019

(65) Prior Publication Data

US 2020/0018699 A1    Jan. 16, 2020

(30) Foreign Application Priority Data

Jul. 12, 2018   (JP) .............................. JP2018-132047

(51) Int. Cl.
| | |
|---|---|
| *G01N 21/41* | (2006.01) |
| *G01N 27/22* | (2006.01) |
| *B60S 1/08* | (2006.01) |
| *G01W 1/14* | (2006.01) |
| *G01N 21/55* | (2014.01) |
| *G01N 21/43* | (2006.01) |

(52) U.S. Cl.
CPC .......... *G01N 21/41* (2013.01); *G01N 27/223* (2013.01); *B60S 1/0837* (2013.01); *G01N 21/43* (2013.01); *G01N 21/55* (2013.01); *G01N 2021/435* (2013.01); *G01N 2021/555* (2013.01); *G01W 1/14* (2013.01)

(58) Field of Classification Search
CPC ...... G01N 21/41; G01N 27/223; G01N 21/55; G01N 21/43; G01N 2021/555; G01N 2021/435; B60S 1/0837; G01W 1/14
See application file for complete search history.

(56) References Cited

U.S. PATENT DOCUMENTS

| | | | | |
|---|---|---|---|---|
| 4,189,236 A | * | 2/1980 | Hogg ................. | G01N 15/1436 250/461.2 |
| 6,361,136 B1 | * | 3/2002 | Watanabe ........... | B41J 2/17546 347/19 |

(Continued)

FOREIGN PATENT DOCUMENTS

| | | |
|---|---|---|
| JP | 2014-211358 | 11/2014 |
| JP | 2014-238383 | 12/2014 |

*Primary Examiner* — Melissa J Koval
*Assistant Examiner* — Joseph O Nyamogo
(74) *Attorney, Agent, or Firm* — IPUSA, PLLC

(57) ABSTRACT

A droplet sensor includes an optical cover that forms part of a spheroid, a major axis of the spheroid being a vertical axis, a light emitting/receiving device disposed at a position offset from a first focal point of the spheroid along the major axis, and a reflector disposed in vicinity of a second focal point of the spheroid. The optical cover has an effective detection area between the light emitting/receiving device and the reflector. The effective detection area satisfies a total internal reflection condition at an interface with a gas, and does not satisfy the total internal reflection condition at an interface with a liquid. The reflector reflects, towards a light receiving surface of the light emitting/receiving device, light totally reflected by the effective detection area, or reflects, towards the effective detection area, light directly incident on the reflector from the light emitting/receiving device.

20 Claims, 28 Drawing Sheets

(56) References Cited

U.S. PATENT DOCUMENTS

| | | | | |
|---|---|---|---|---|
| 8,271,198 B2* | 9/2012 | Teder | ............... | G01N 21/552 |
| | | | | 702/3 |
| 2002/0033459 A1* | 3/2002 | Graves | ............. | B60S 1/0822 |
| | | | | 250/573 |
| 2005/0174561 A1* | 8/2005 | Murakami | ......... | B60S 1/0837 |
| | | | | 356/37 |
| 2007/0085023 A1* | 4/2007 | Debroche | ........ | G01N 21/0303 |
| | | | | 250/458.1 |

* cited by examiner

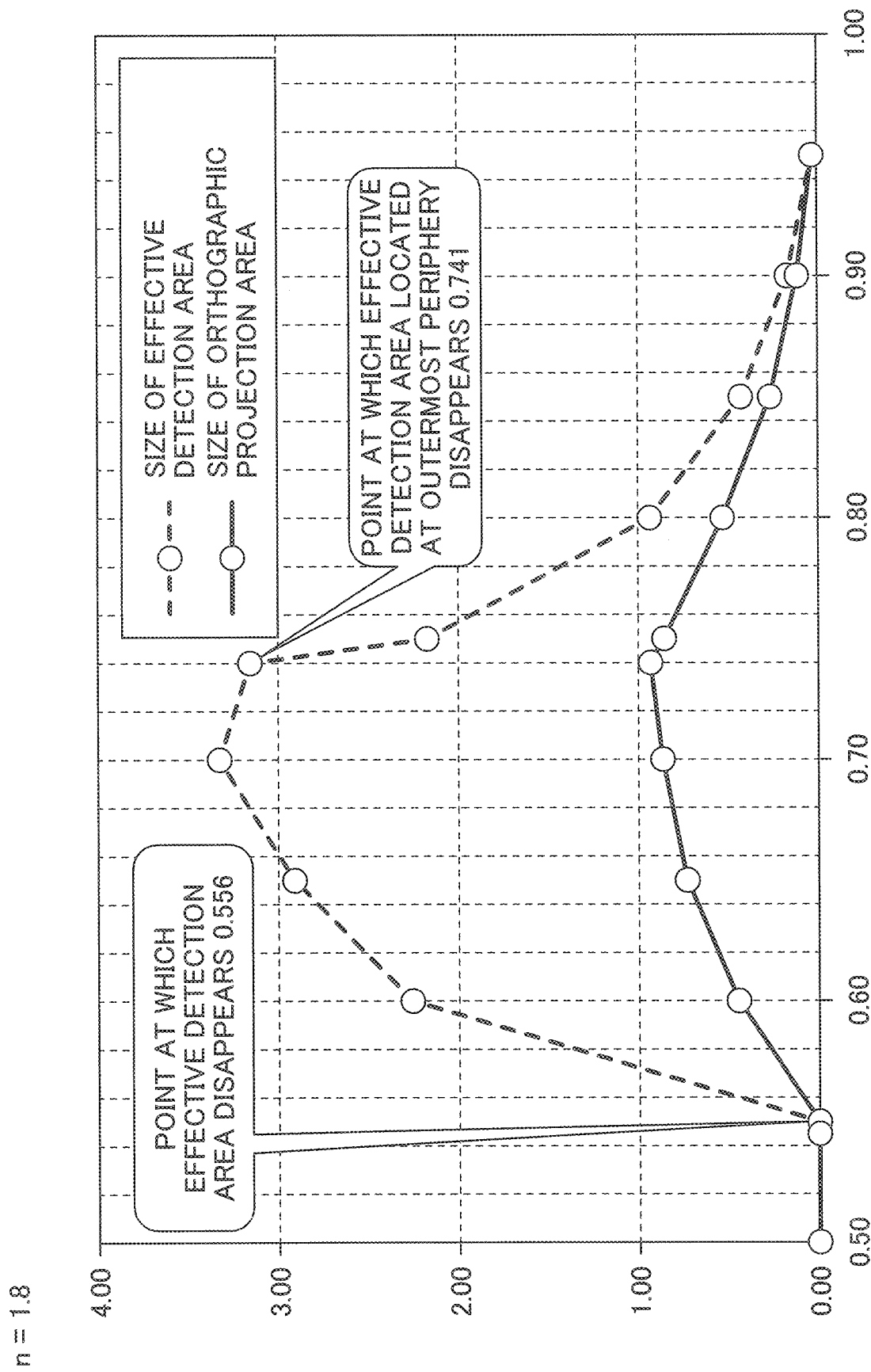

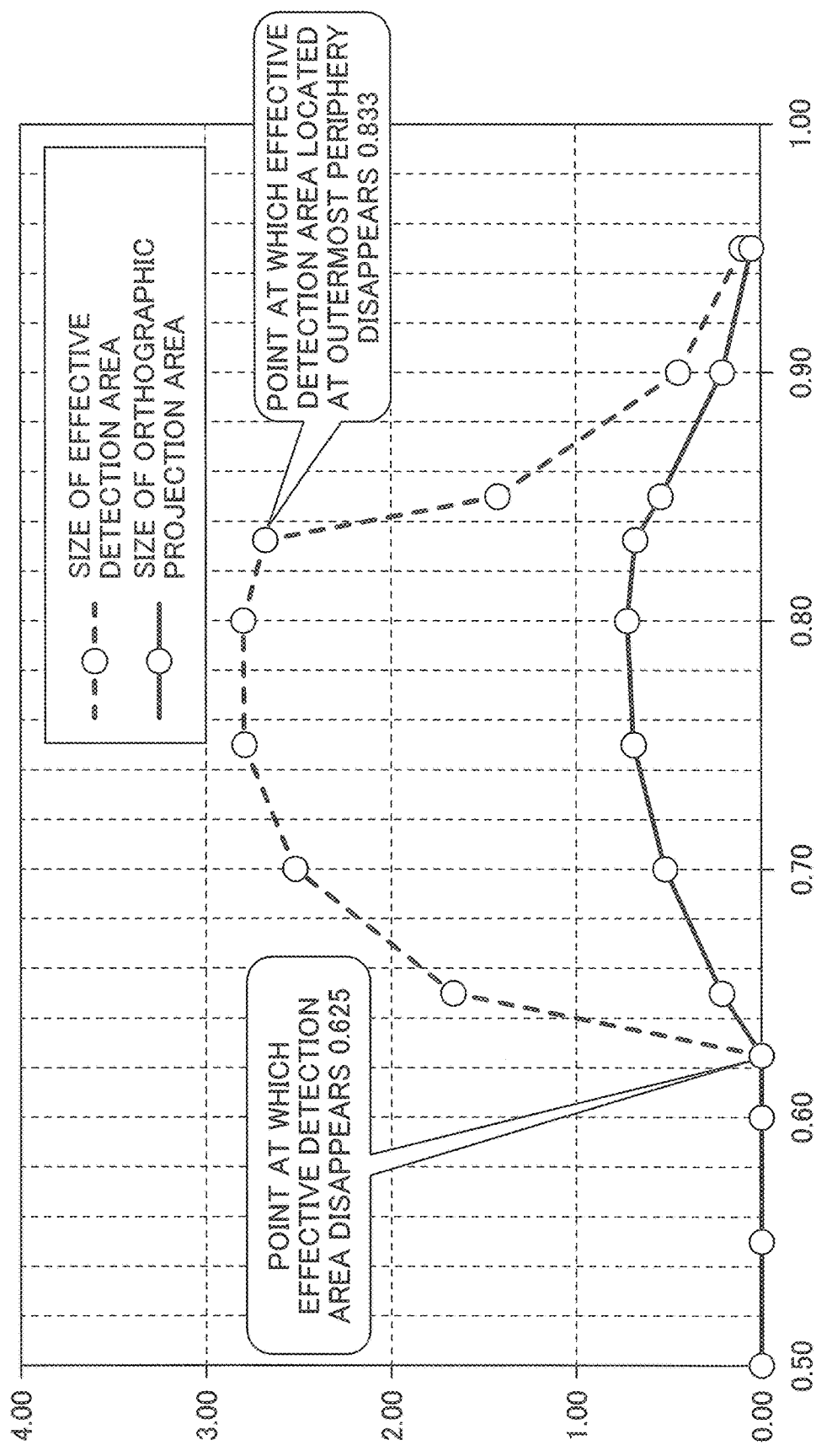

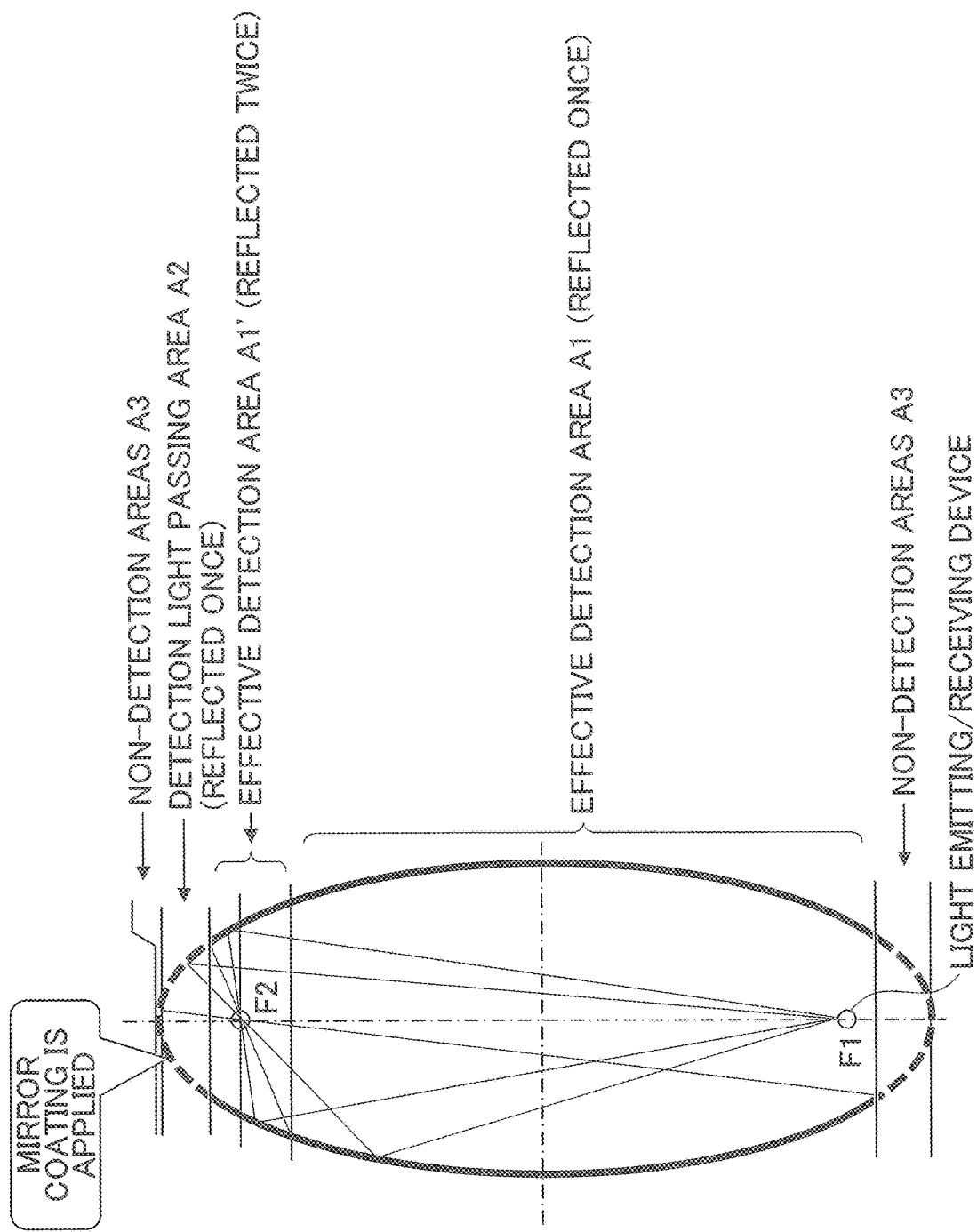

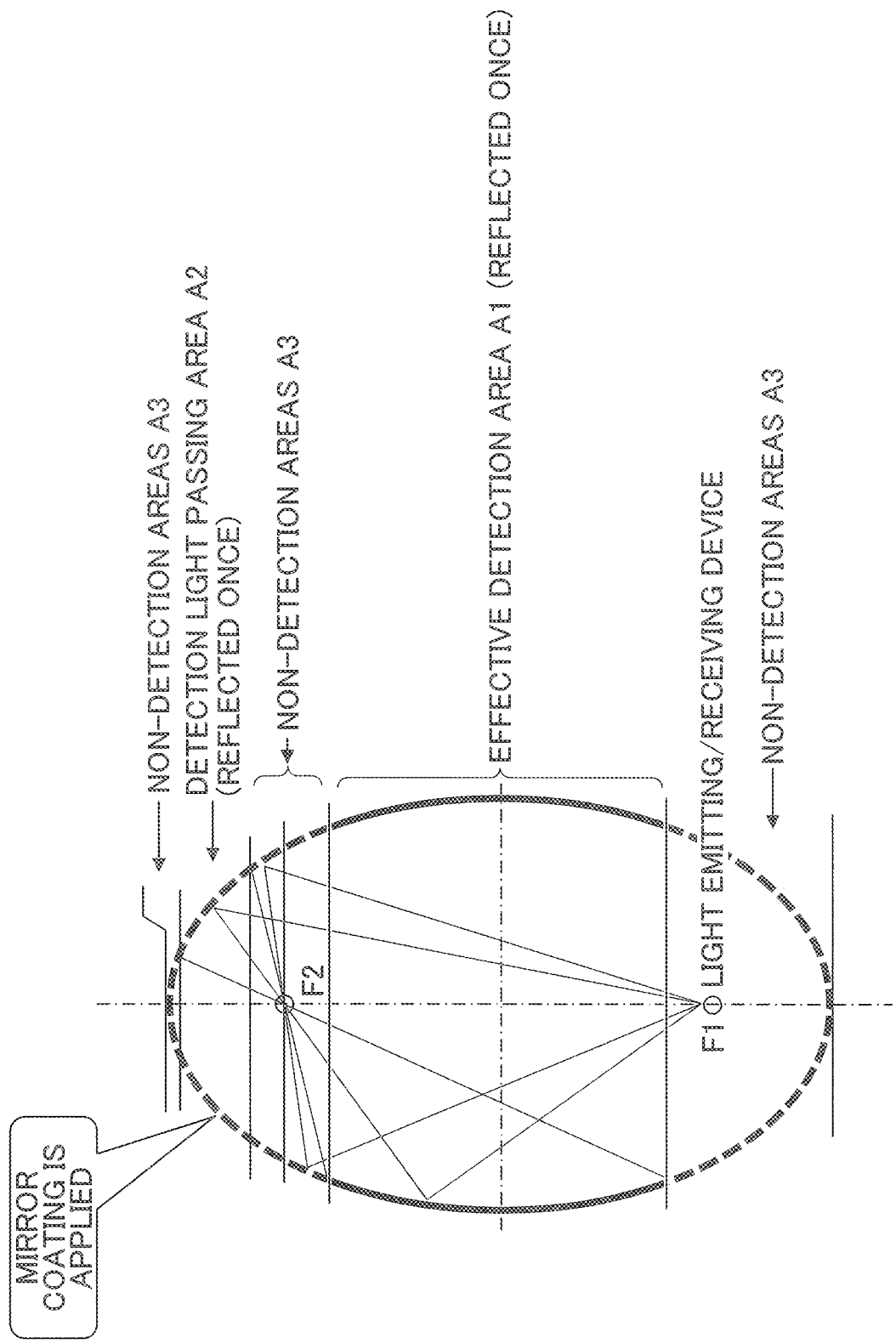

REFRACTIVE INDEX n = 1.57
(WHEN ECCENTRICITY is 0.826)

EFFECTIVE DETECTION AREA

| ITEM | NORMALIZED VALUE | (EXAMPLE) WHEN SEMI-MAJOR AXIS IS NORMALIZED TO 30 mm |
|---|---|---|
| SEMI-MAJOR AXIS | 1.00 | 30 mm |
| SEMI-MINOR AXIS | 0.563 | 16.9 mm |
| ECCENTRICITY | 0.826 ||
| EFFECTIVE SURFACE AREA | 2.68 | 2410 mm$^2$ |
| ORTHOGRAPHIC PROJECTION AREA (PROJECTION AREA) | 0.681 | 613 mm$^2$ |

0~1.9°

2.0~3.4°

3.5~6.8°

6.9~14.8°

14.9～36.0°

36.1~90.0°

☐ 0.50 – 1.00
☐ 0.00 – 0.50
☐ –0.50 – 0.00
■ –1.00 – –0.50

|  |  | ECCENTRICITY e | | | | |
|---|---|---|---|---|---|---|
|  |  | 0.65 | 0.7 | 0.75 | 0.8 | 0.85 |
| REFRACTIVE INDEX n | 1.2 | –0.52 | –0.40 | –0.26 | –0.11 | 0.05 |
|  | 1.4 | –0.13 | –0.04 | 0.08 | 0.24 | 0.46 |
|  | 1.6 | 0.04 | 0.14 | 0.29 | 0.47 | 0.68 |
|  | 1.8 | 0.16 | 0.28 | 0.44 | 0.61 | 0.81 |

US 11,525,776 B2

DROPLET SENSOR

CROSS-REFERENCE TO RELATED APPLICATIONS

This application is based on and claims priority to Japanese Patent Application No. 2018-132047, filed on Jul. 12, 2018, the entire contents of which are incorporated herein by reference.

BACKGROUND OF THE INVENTION

1. Field of the Invention

The disclosures herein relate to a droplet sensor that senses droplets such as raindrops and water drops.

2. Description of the Related Art

Apparatuses that detect raindrops based on changes in reflectance when raindrops adhere to raindrop detection areas of transparent plates are known (see Patent Document 1 and Patent Document 2, for example). In such an apparatus, light emitted from a light emitting element is reflected by the surface of a transparent plate, and is received by a light receiving element. When a raindrop adheres to a raindrop detection area, the reflectance of light changes at an interface of the transparent plate. As a result, the amount of received light changes, and the presence of the raindrop can be detected.

In Patent Document 1, a first reflection means and a second reflection means are used in addition to a transparent plate, and light repeatedly reflected multiple times is received by a light receiving element. The reflection surface of the second reflection means has a complicated shape, which is difficult to be manufactured. Further, both totally reflected light and diffused light are incident on the light receiving element. In addition, optical path lengths from a light emitting element to the light receiving element differ depending on the reflection patterns of light. Specifically, light reflected multiple times has a longer optical path. Accordingly, sensitivity varies depending on the position where a raindrop adheres, thus resulting in a decrease in detection accuracy.

In Patent Document 2, a refraction optical element is used to collimate light beams emitted from a light emitting element, such that the collimated light beams are incident on a transparent plate, and also an optical element is used to collect light beams totally reflected by the transparent plate and to direct the collected light beams towards a light receiving element. In order to expand a detection area, the refraction optical element is required to have a size corresponding to the detection area. Further, the refraction optical element is divided into a plurality of areas, and thus has a complicated shape. Therefore, it is difficult to manufacture, install, and fix, to an apparatus, such a refraction optical element.

RELATED-ART DOCUMENTS

Patent Documents

Patent Document 1 is Japanese Patent No. 6094354, and Patent Document 2 is Japanese Patent No. 6167799.

SUMMARY OF THE INVENTION

It is a general object of the present invention to provide a droplet sensor having a wide detection area and high sensitivity with a simple configuration.

According to at least one embodiment, a droplet sensor includes an optical cover that forms part of a spheroid, a major axis of the spheroid being a vertical axis, a light emitting and receiving device disposed at a position offset from a first focal point of the spheroid along the major axis, and a reflector disposed in vicinity of a second focal point of the spheroid. The optical cover has an effective detection area between the light emitting and receiving device and the reflector. The effective detection area satisfies a total internal reflection condition at an interface with a gas, and does not satisfy the total internal reflection condition at an interface with a liquid. The reflector reflects, towards a light receiving surface of the light emitting and receiving device, light totally reflected by the effective detection area, or reflects, towards the effective detection area, light directly incident on the reflector from the light emitting and receiving device.

BRIEF DESCRIPTION OF THE DRAWINGS

Other objects and further features of the present invention will be apparent from the following detailed description when read in conjunction with the accompanying drawings, in which:

FIGS. 6A through 6C are graphs illustrating eccentricity dependence of the effective detection area when the refractive index is changed;

FIGS. 7A and 7B are diagrams illustrating relationships between focal positions and optical paths of spheroids;

FIGS. 8A through 8C are images and numerical data of a spheroid according to an embodiment;

DESCRIPTION OF THE EMBODIMENTS

In the following, embodiments of the present invention will be described with reference to the accompanying drawings. In the embodiments, the presence of a droplet is optically detected by utilizing a change in reflection due to a difference in refractive index between a gas and a liquid. In order to accurately and efficiently detect a droplet that adheres to a sensor, the shape of the detection surface of the sensor is devised.

Figure 1A:
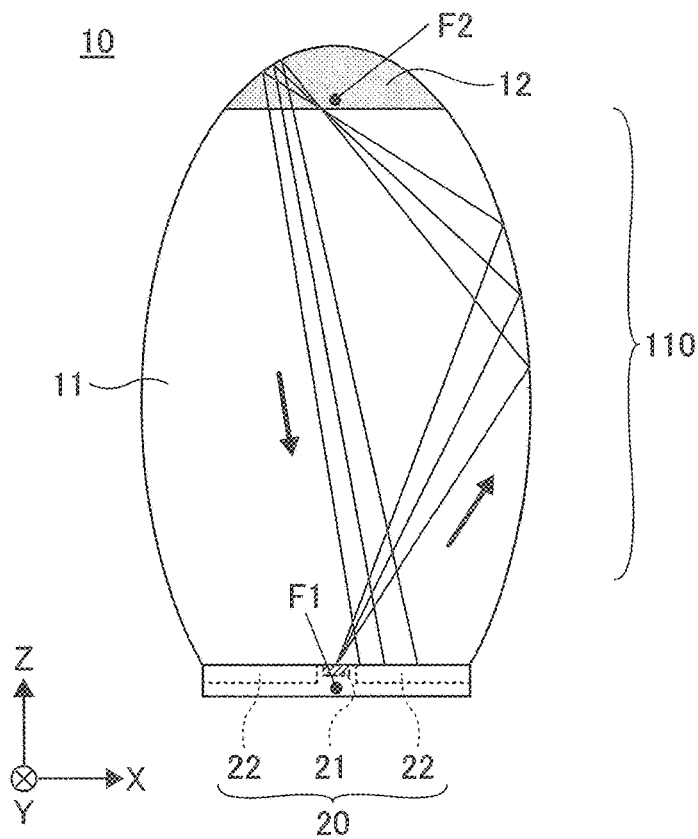
FIGS. 1A and 1B are diagrams illustrating a basic configuration of a rain sensor according to an embodiment.
Figure 1B:
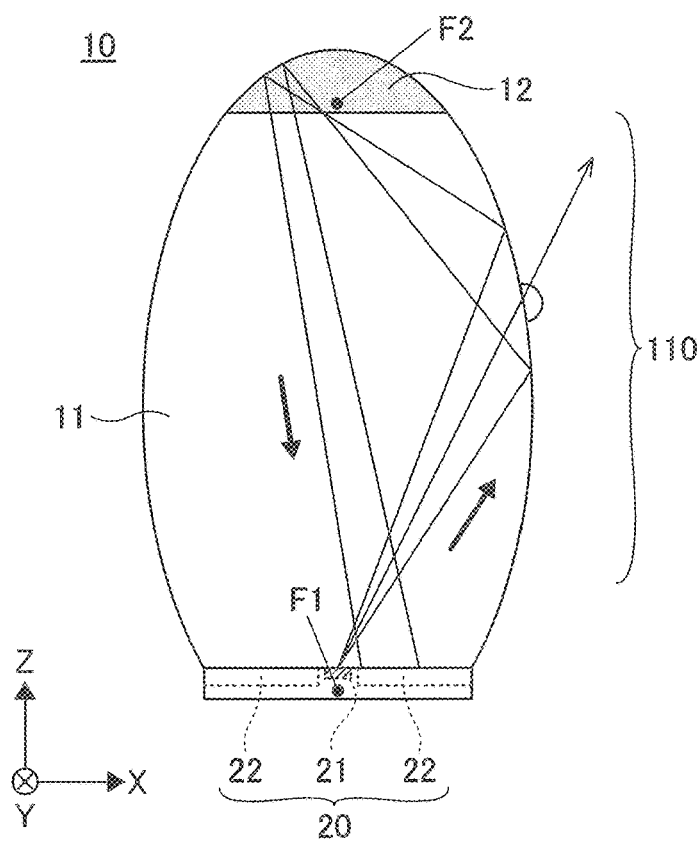

FIGS. 1A and 1B are diagrams illustrating a basic configuration of a droplet sensor according to an embodiment. The droplet sensor may be used as a rain sensor 10, and detects adhesion of raindrops. Based on a result of the detected raindrops, rainfall per unit time and/or per unit area can be measured. The droplet sensor may be adopted to detect droplets, other than raindrops, such as dew condensation, water drops, and inks. In the following, the rain sensor 10 will be described as an example.

The rain sensor 10 includes an optical cover 11 that forms part of a spheroid, a light emitting and receiving device 20 provided in the vicinity of a first focal point F1 of the spheroid, and a reflector 12 provided on the second focal point F2 side. The optical cover 11 has a shape formed by cutting a part of the spheroid, in the vicinity of the first focal point F1. The major axis of the spheroid is an axis in the vertical direction (in the Z-direction). The reflector 12 may be a metal-coated mirror surface.

The light emitting and receiving device 20 includes a light source and a light detector. In this example, a light emitting element 21 and light receiving element 22 are integrated into one substrate and formed as one chip for size reduction. In the configuration example of FIGS. 1A and 1B, the light emitting surface and the light receiving surface of the light emitting and receiving device 20 are located either slightly closer to or slightly farther from the center of the spheroid relative to the first focal point F1 in the major axis of the spheroid.

Because of the nature of the spheroid, light emitted from the first focal point is reflected by the surface of the spheroid, passes through the second focal point, is reflected by the surface of the spheroid again, and is reflected back to the first focal point. The rain sensor 10 is designed to utilize the above-described nature, such that light, emitted from the light emitting element 21 located in the vicinity of the first focal point, is reflected by the surface of the spheroid twice, and then returns to the light receiving element 22 surrounding the light emitting element 21.

The optical cover 11 has an effective detection area 110 between the light emitting and receiving device 20 and the reflector 12. The effective detection area 110 is part of the curved surface of the spheroid. The effective detection area 110 satisfies total internal reflection conditions at an interface with a gas, and does not satisfy the total internal reflection conditions at an interface with a liquid. The effective detection area 110 includes at least an upper half area of the spheroid in the Z-direction.

As illustrated in FIG. 1A, when no raindrop adheres to the rain sensor 10, light emitted from the light emitting element 21 and totally reflected by the effective detection area 110 of the optical cover 11, is reflected by the reflector 12 again, and is incident on the light receiving element 22. Alternatively, as will be described later, light emitted from the light emitting element 21 is reflected by the reflector 12, is then totally reflected by the effective detection area 110, and is incident on the light receiving element 22. Because of the nature of the spheroid, if the light emitting surface of the light emitting element 21 were to be located at the same position as the first focal point F1, light that has been totally reflected by the effective detection area 110, passed through the second focal point F2, and reflected by the reflector 12 would return to the first focal point F1. Light that has been emitted from the light emitting element 21, reflected by the reflector 12, and passed through the second focal point F2 would also return to the first focal point F1. In order to allow returned light to be incident on the light receiving surface of the light receiving element 22, the light emitting and receiving device 20 is disposed at a position offset from the first focal point F1 along the major axis.

As illustrated in FIG. 1B, when a raindrop adheres to the surface of the rain sensor 10, the total internal reflection conditions are not satisfied at the interface between the optical cover 11 and the liquid, and most light emitted from the light emitting element 21 is transmitted from the position to which the raindrop adheres. As a result, the amount of light received by the light receiving element 22 is decreased. By monitoring changes in the amount of light received by the light receiving element 22, it is possible to detect the presence of and the amount of raindrops. The shape of the optical cover 11 that forms part of the spheroid is isotropic with respect to the top. Therefore, the optical cover 11 can detect raindrops regardless of the position to which the raindrops adhere.

In general, raindrops often adhere to detection areas not only vertically but also obliquely from above. In the example of FIGS. 1A and 1B, the surface of the spheroid between the reflector 12 and the light emitting and receiving device 20 is defined as the effective detection area 110; however, in actual operation, the upper half of the vertically placed spheroid is used as a main detection area. Not only raindrops directly adhering to the effective detection area 110, but also raindrops adhering to the reflector 12 are detected upon reaching the effective detection area 110 after flowing downward along the surface of the spheroid. As will be described later, by applying a water-repellent film to the surface of the effective detection area 110 of the optical cover 11, it becomes possible for raindrops detected in the effective detection area 110 to rapidly flow downward, thereby allowing the rain sensor 10 to prepare for next detection of raindrops.

Figure 2A:
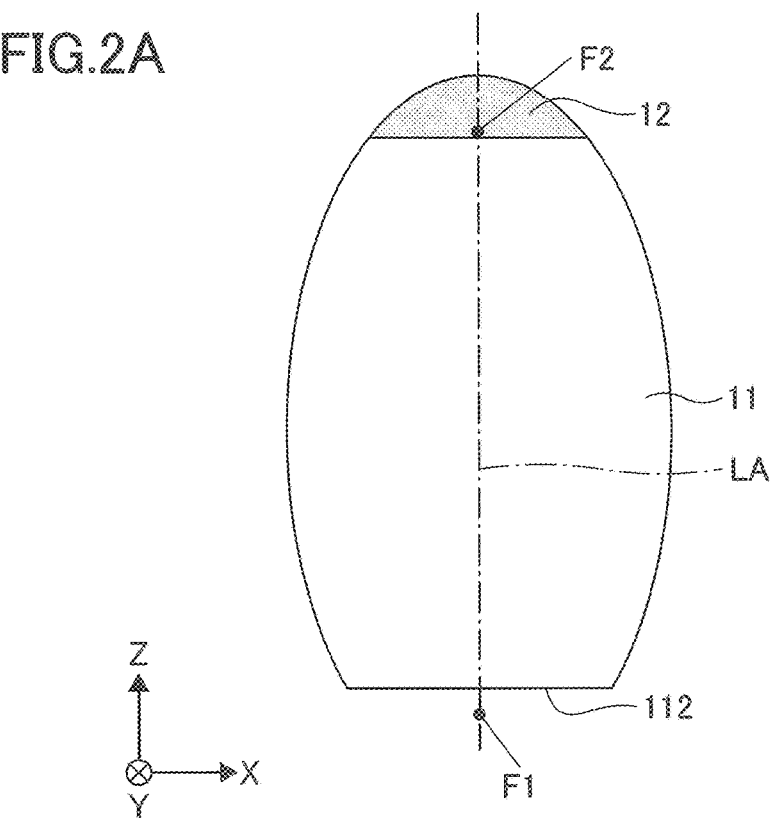
FIGS. 2A and 2B are diagrams illustrating an optical cover of the rain sensor.
Figure 2B:
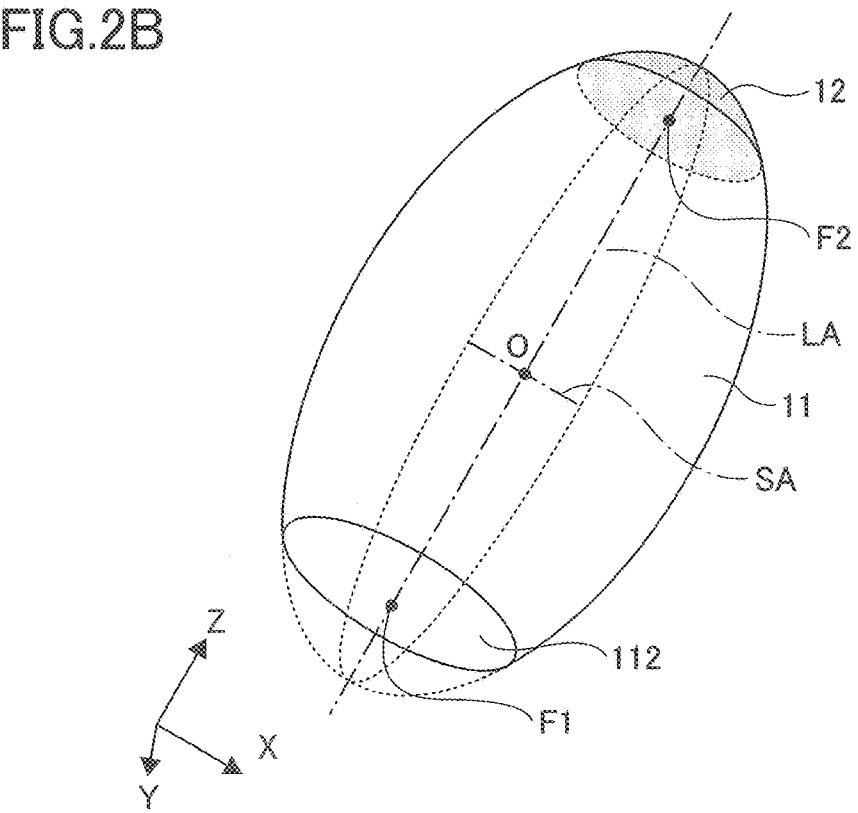

FIGS. 2A and 2B are diagrams illustrating the optical cover 11. FIG. 2A is a side view, and FIG. 2B is a perspective view from an obliquely downward direction. The optical cover 11 is a solid cover that forms part of the spheroid, and is formed of a material transparent to the wavelength of light emitted from the light emitting element 21.

In the examples of FIGS. 2A and 2B, a spheroid is obtained by causing an ellipse having a major axis LA in the Z-direction and a minor axis SA in the X-direction to rotate about the major axis LA. The optical cover 11 has a shape cut by a plane perpendicular to the Z-axis, namely cut by a plane parallel to the X-Y plane. The position where the spheroid is cut is a position that is offset from the first focal point F1, for example, a position that approaches the center O of the spheroid along the major axis LA. The cut surface serves as a bottom surface 112 of the optical cover 11. The second focal point F2 is located within the optical cover 11. The reflector 12 that covers the top is provided on the second focal point F2 side.

An area in the vicinity of the top where the reflector 12 is formed does not satisfy the total internal reflection conditions at the interface with a gas, and does not satisfy the total internal reflection conditions at the interface with a liquid (90% or more of light is transmitted, for example). Therefore, the area in the vicinity of the top cannot be used as an effective detection area. However, the area in the vicinity of the top can be used as a reflection area by utilizing the above-described nature of the spheroid. The reflector 12 is provided at the top near the second focal point F2. The reflector 12 causes light totally reflected by the effective detection area 110 to be directed towards the light receiving surface, or causes part of light directly incident on the reflector 12 from the light emitting element 21 to be reflected towards the effective detection area 110. As will be described later, light beams directly incident on the reflector 12 pass through different paths in accordance with the angles of incidence, and there are several patterns of light receiving states. The light receiving states will be described later in detail.

Figure 3A:
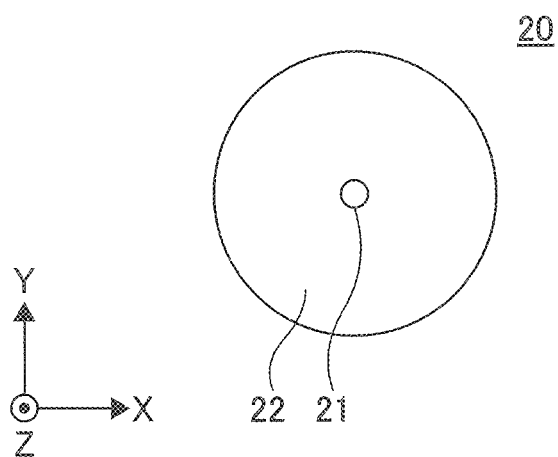
FIGS. 3A through 3C are schematic diagrams illustrating a light emitting and receiving device of the rain sensor.
Figure 3B:
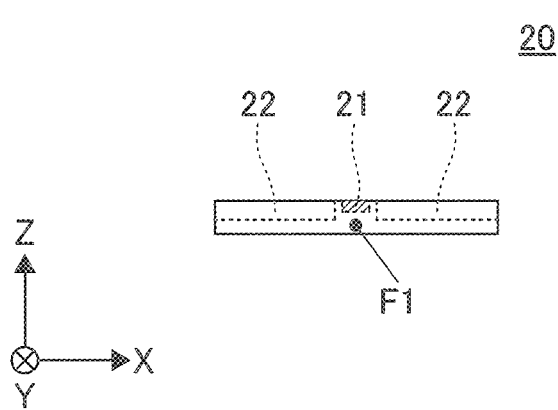
Figure 3C:
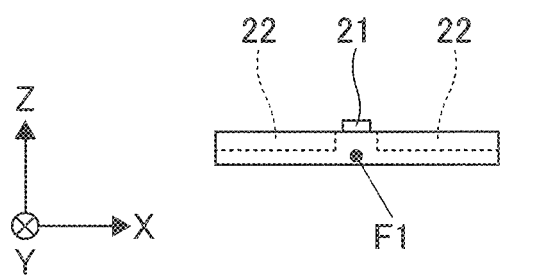

FIGS. 3A through 3C are schematic diagrams illustrating the light emitting and receiving device 20 of the rain sensor 10. FIG. 3A is a top view, and FIGS. 3B and 3C are cross-sectional views. The light emitting and receiving device 20 includes the light emitting element 21 and the light receiving element 22 formed on or integrally mounted on a substrate 201. The light emitting element 21 may be a device such as a light-emitting diode that emits near-infrared light or a non-polarized vertical-cavity surface-emitting laser (VCSEL). The light receiving element 22 may be a quantum well light receiving element having sensitivity to light in the near-infrared region.

The light emitting surface of the light emitting element 21 and the light receiving surface of the light receiving element 22 may be located on the same plane as illustrated in FIG. 3B. In this case, the light emitting surface and the light receiving surface may make surface contact with the bottom surface 112 of the optical cover 11 illustrated in FIG. 2. As illustrated in FIG. 3C, the light emitting surface of the light emitting element 21 may be provided at a position closer to the center of the spheroid relative to the light receiving surface of the light receiving element 22. In this case, the light emitting element 21 may be embedded in the optical cover 11 and the light receiving element 22 may make surface contact with the bottom surface 112 of the optical cover 11. In both cases, the light emitting/receiving surface of the light emitting and receiving device 20 is offset from the first focal point F1 along the major axis in the positive Z-direction or in the negative Z-direction. Accordingly, returned light that has been totally reflected by the effective detection area 110 and reflected by the reflector 12, or components of light that has been directly incident on the reflector 12 and totally reflected by the effective detection area 110 can be directed towards the light receiving surface. By providing the light receiving element 22 surrounding the entire circumference of the light emitting element 21, it is possible to efficiently detect reflected returned light.

Figure 4:
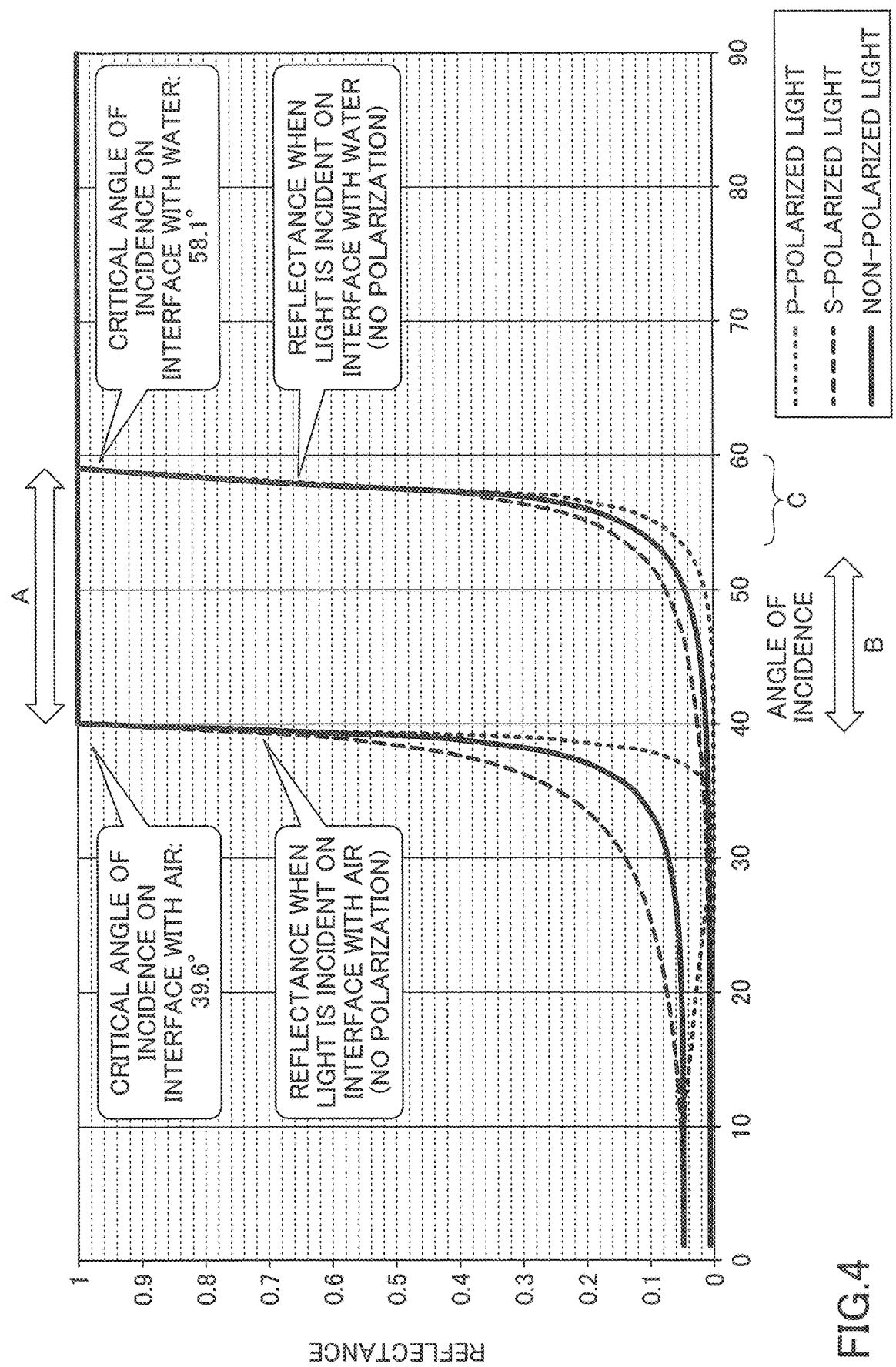
FIG. 4 is a graph illustrating the detection principle of the rain sensor according to the embodiment.

FIG. 4 is a graph illustrating the detection principle of the rain sensor 10 according to the embodiment. In FIG. 4, the horizontal axis represents an angle of incidence when light emitted from the light emitting element 21 is incident on interfaces with air and water. The vertical axis represents the reflectance at the interfaces. In FIG. 4, the continuous line curve on the left indicates the reflectance at the interface with air, and the continuous line curve on the right indicates the reflectance at the interface with water. The dotted lines indicate the reflectance of P-polarized light, the dashed lines indicate the reflectance of S-polarized light, and the continuous lines indicate the reflectance of non-polarized light.

The reflectance depends on the angle of incidence of light on an interface and also depends on the refractive index. In FIG. 4, polycarbonate (refractive index n=1.57) is used as a material of the optical cover 11. FIG. 4 represents angle-of-incidence dependence of the reflectance when light is incident from polycarbonate on air or water. The refractive index of air is defined as 1, and the refractive index of water is defined as 1.33. The reflectance when light is incident on an interface between materials with different refractive indices and is reflected depends on the difference in the refractive indices and the angle of incidence (Fresnel reflection).

The critical angle of incidence from polycarbonate to air is 39.6°, and the critical angle of incidence from polycarbonate to water is 58.1°. In a case where water drops or raindrops are detected by utilizing the total internal reflection phenomenon, it is generally considered that the rain sensor 10 uses a range A in which the angle of incidence onto the interface with water is 40° to 58°. However, in a range C in which the angle of incidence exceeds 52°, the reflectance of light incident on the interface with water is not sufficiently small. Namely, in the range C, it is not possible to obtain sufficiently high transmittance at the interface with water. Therefore, the rain sensor 10 may use a range B in which the angle of incidence onto the interface is 40° to 52°, instead of using the range C in which detection sensitivity may decrease to a certain extent due to the influence of Fresnel reflection. By using the angle-of-incidence range B, detection sensitivity improves.

The angle-of-incidence range B also depends on the refractive index of a material of the optical cover 11. Thus, the material and the shape of the optical cover 11 are selected such that light is incident on an interface at an appropriate angle that enables high sensitivity detection. The shape of the optical cover 11 can be determined by the eccentricity of the spheroid. The eccentricity e is determined by the ratio of a distance between the center "O" of the spheroid and a focal point F (F1 or F2) to a semi-major axis "a" (e=|OF|/a).

Figure 5:
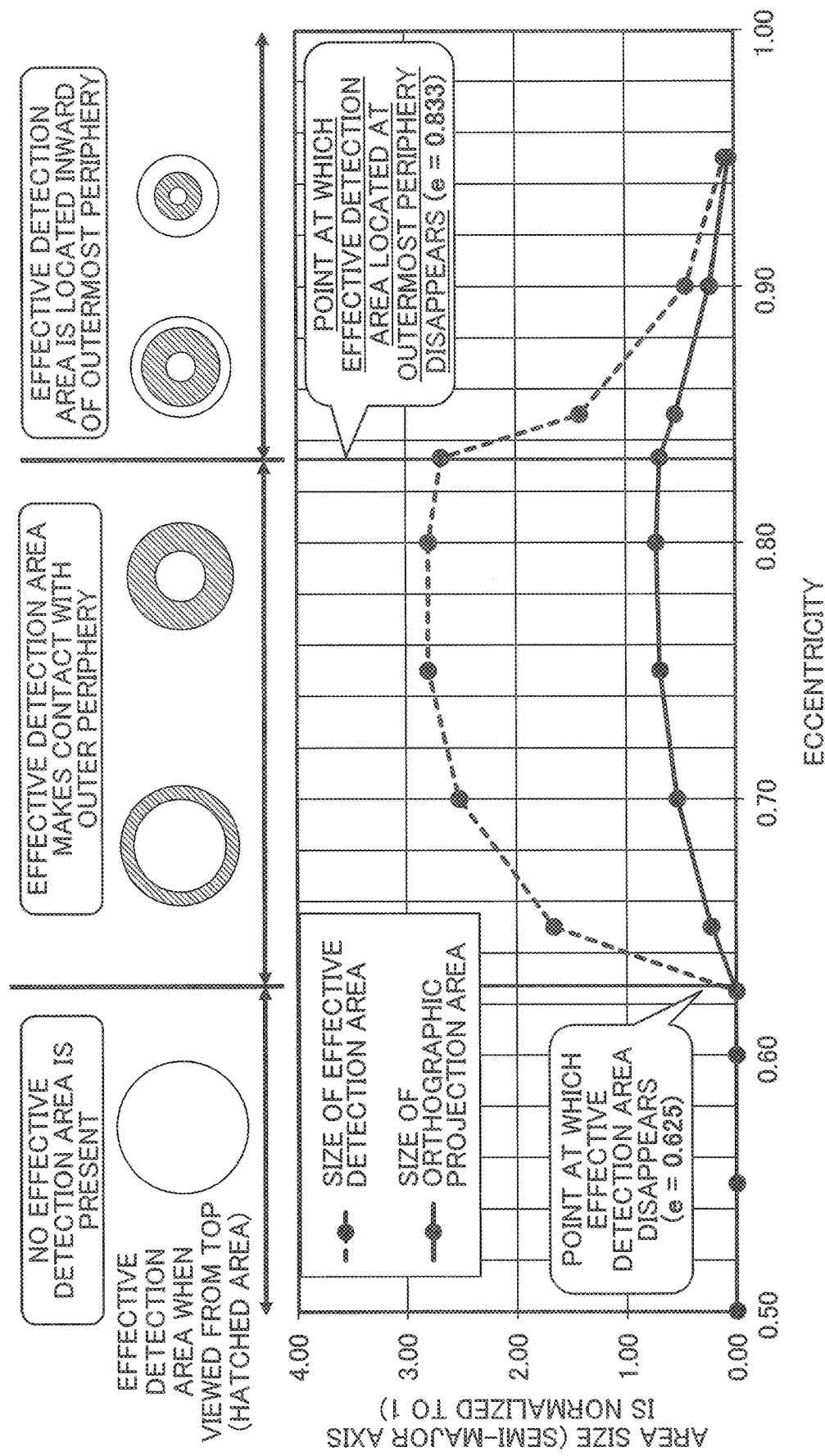
FIG. 5 is a graph illustrating a relationship between an effective detection area and the eccentricity of a spheroid.

FIG. 5 is a graph illustrating eccentricity dependence of the effective detection area. In the actual design, the light emitting and receiving device 20 is provided at a position offset from the focal point of the spheroid along the optical axis (in the positive or negative Z-direction). However, for convenience of description of the embodiments and variations illustrated in FIG. 5 and subsequent figures, the light emitting and receiving device 20 is assumed to be located in the vicinity of the focal point. In the upper part of FIG. 5, the effective detection area when viewed from the top of the vertically placed spheroid is indicated by hatched lines. The lower part of FIG. 5 illustrates relationships between the eccentricity when the refractive index of the spheroid is 1.60 versus the size of the effective detection area (indicated by the dotted line) and the size of an orthographic projection area (indicated by the continuous line). The vertical axis indicates an area size when the semi-major axis is normalized to 1.

When the eccentricity is approximately 0.773, the size of the effective detection area becomes largest. When the eccentricity is 0.625 or less, there is no effective detection area. Namely, there is only a "non-total internal reflection area" where total internal reflection does not occur at the interface with either air or water. When the eccentricity exceeds 0.833, the effective detection area is located inward of the outermost periphery. As the eccentricity becomes closer to 1 (as the vertical length increases), the effective detection area decreases. However, when the eccentricity is 0.95 or less, adhesion of raindrops can be effectively detected. Note that, even when the eccentricity is 0.95 or more (not illustrated in FIG. 5), the effective detection area still exists, although a practically usable range as the effective detection area becomes significantly smaller.

Figure 6C:
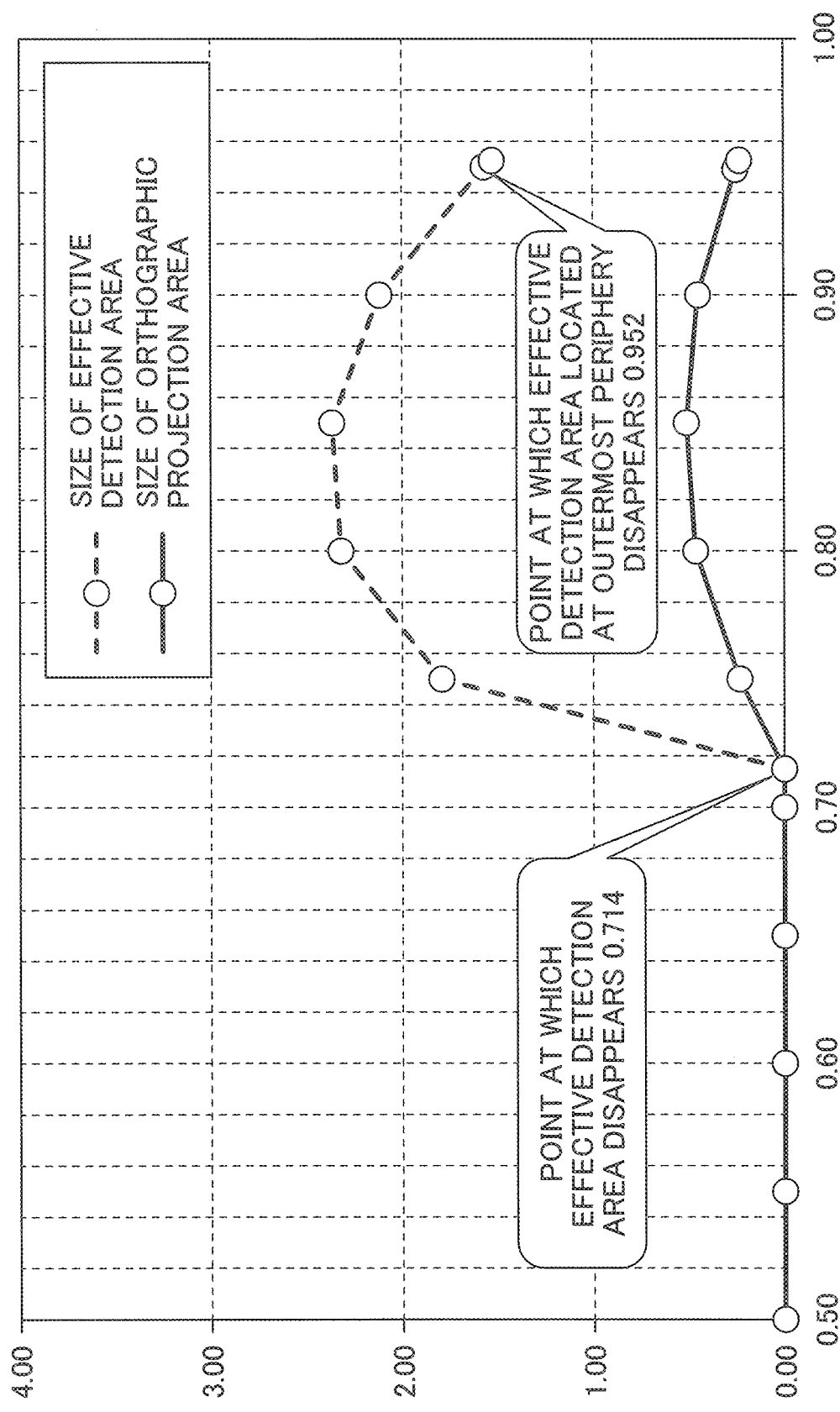

FIGS. 6A through 6C are graphs illustrating relationships between the eccentricity and the effective detection area when the refractive index is changed. FIG. 6A illustrates the eccentricity dependence of the size of the effective detection area when the refractive index is 1.8. FIG. 6B illustrates the eccentricity dependence of the size of the effective detection area when the refractive index is 1.6. FIG. 6C illustrates the eccentricity dependence of the size of the effective detection area when the refractive index is 1.4. In FIGS. 6A through 6C, the dashed lines indicate the size of the effective detection area, and the continuous lines indicate the size of the orthographic projection area. The vertical axis indicates an area size when the semi-major axis is normalized to 1.

In FIGS. 6A through 6C, the refractive indices of 1.8, 1.6, and 1.4 are refractive indices at near-infrared wavelengths used for the rain sensor 10 according to the embodiment. It should be noted that the refractive indices of 1.8, 1.6, and 1.4 include 1.8±0.01, 1.6±0.01, and 1.4±0.01, respectively, by taking into account error.

In FIG. 6A, with the refractive index of 1.8±0.01, the optical cover 11 is preferably designed such that the eccentricity e is greater than 0.556 and less than 0.95 ($0.556<e<0.95$). If a material whose refractive index exceeds 1.8 is used, the eccentricity is shifted to smaller values, and the effective detection area can have a sufficient size even with the eccentricity of 0.55.

In FIG. 6B, with the refractive index of 1.6±0.01, the optical cover 11 is designed such that the eccentricity e is greater than 0.625 and less than 0.95 ($0.625<e<0.95$).

In FIG. 6C, with the refractive index of 1.4±0.01, the optical cover 11 is designed such that the eccentricity e is greater than 0.714 ($0.714<e$).

If the optical cover is formed of any material with a refractive index of 1.4 to 1.8, it is desirable to design the optical cover such that the eccentricity falls within a range greater than 0.7 and less than or equal to 0.9, and more preferably falls within a range of 0.7 to 0.85. Typically, a material of the optical cover 11 is known. Thus, a range of the eccentricity may be selected in accordance with the refractive index of the material of the optical cover 11. In addition, the eccentricity may be selected such that the effective detection area becomes largest. It should be noted that, depending on the intended use of the rain sensor 10, eccentricity is not required to be selected such that the effective detection area becomes largest, as long as the eccentricity falls within a set range.

Referring to FIGS. 6A through 6C, as the refractive index of the optical cover 11 decreases, namely the difference in refractive index with air and with water decreases, an appropriate range of the eccentricity increases. If a material with a low refractive index is used, the effective detection area can be increased by increasing the eccentricity. However, the higher the refractive index, the greater the absolute amount of the effective area.

When acrylic resin and polycarbonate are compared, the refractive index of acrylic resin for near-infrared light is 1.485, and the refractive index of polycarbonate for near-infrared light is 1.57. Therefore, by using polycarbonate as a material of the optical cover 11, the effective detection area can be increased. Further, if a high density organic polymer with high polarizability is used, the refractive index for near-infrared light becomes approximately 1.8, and the effective detection area can be further increased. Even if a low cost resin material with a low refractive index is used in terms of manufacturing costs, the eccentricity can be set to maximize the effective detection area.

The optical cover 11 is designed such that the effective detection area 110 having a sufficient size can be formed in accordance with the refractive index of the optical cover 11. Accordingly, it is possible to accurately detect adhesion of raindrops in accordance with changes between when the total internal reflection conditions are satisfied and when the total internal reflection conditions are not satisfied.

FIGS. 7A and 7B are diagrams illustrating relationships between focal positions and optical paths of spheroids when no water drops are attached. The thick continuous lines of the spheroids indicate effective detection areas. The thick dashed lines indicate non-detection areas, and a mirror coating is applied to the reflector 12.

FIG. 7A illustrates optical paths when an effective detection area extends from F1 to outside F2. Light incident on an effective detection area A1, which occupies the center of a spheroid and to which no water drop is attached, is totally reflected by the effective detection area A1 once, is then reflected by the reflector 12, and is received by the light emitting and receiving device 20. Light incident on an effective detection area A1', located closer to the top relative to the detection area A1, is totally reflected by the effective detection area A1' twice, and is received by the light emitting and receiving device 20.

Light directly incident on a detection light passing area A2 is reflected by the mirror coating, incident on the effective detection area A1, totally reflected by the effective detection area A1 once, and then received by the light emitting and receiving device 20. The top and the bottom of the spheroid are non-detection areas A3, which are also referred to as insensitive areas.

FIG. 7B illustrates optical paths when an effective detection area extends between F1 and F2. Light incident on an effective detection area A1 is totally reflected by the effective detection area A1 once, is reflected by the mirror coating, and is received by the light emitting and receiving device 20. Non-detection areas A3 located closer to the top relative to the detection area A1 are insensitive areas, and light incident on the non-detection areas A3 is not detected. Light incident on a detection light passing area A2 in the vicinity of the top, which is located between the non-detection areas A3, is reflected by the mirror coating towards the effective detection area A1, is totally reflected by the effective detection area A1, and is received by the light emitting and receiving device 20.

As described above, light is detected by the light emitting and receiving device 20 in the following ways.
  (i) Light directly incident on the effective detection area A1 is totally reflected by the effective detection area A1 once, is incident on and totally reflected by the mirror coating applied to the detection light passing area A2 located in the vicinity of the top, and is detected by the light emitting and receiving device 20;
  (ii) Light directly incident on the effective detection area A1' is totally reflected by the effective detection area A1', is totally reflected by the effective detection area A1' again, and is detected by the light emitting and receiving device 20;
  (iii) Light incident on the mirror coating applied to the detection light passing area A2 located in the vicinity of the top is reflected towards the effective detection area A1, is totally reflected by the effective detection area A1, and is detected by the light emitting and receiving device 20.

Figure 8A:
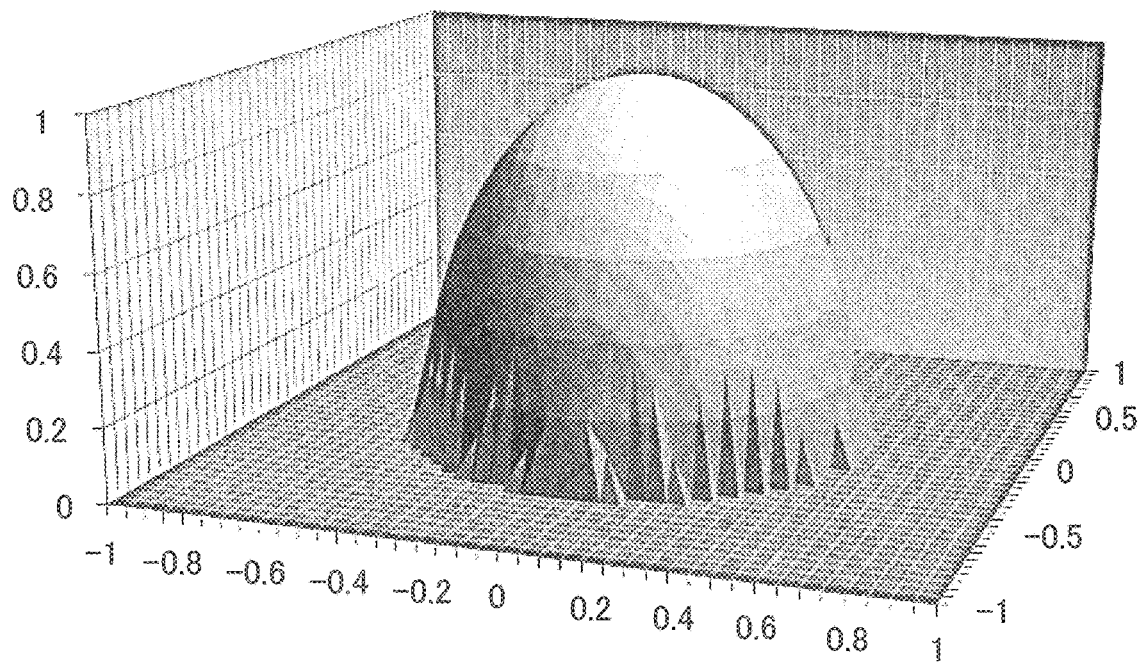
Figure 8B:
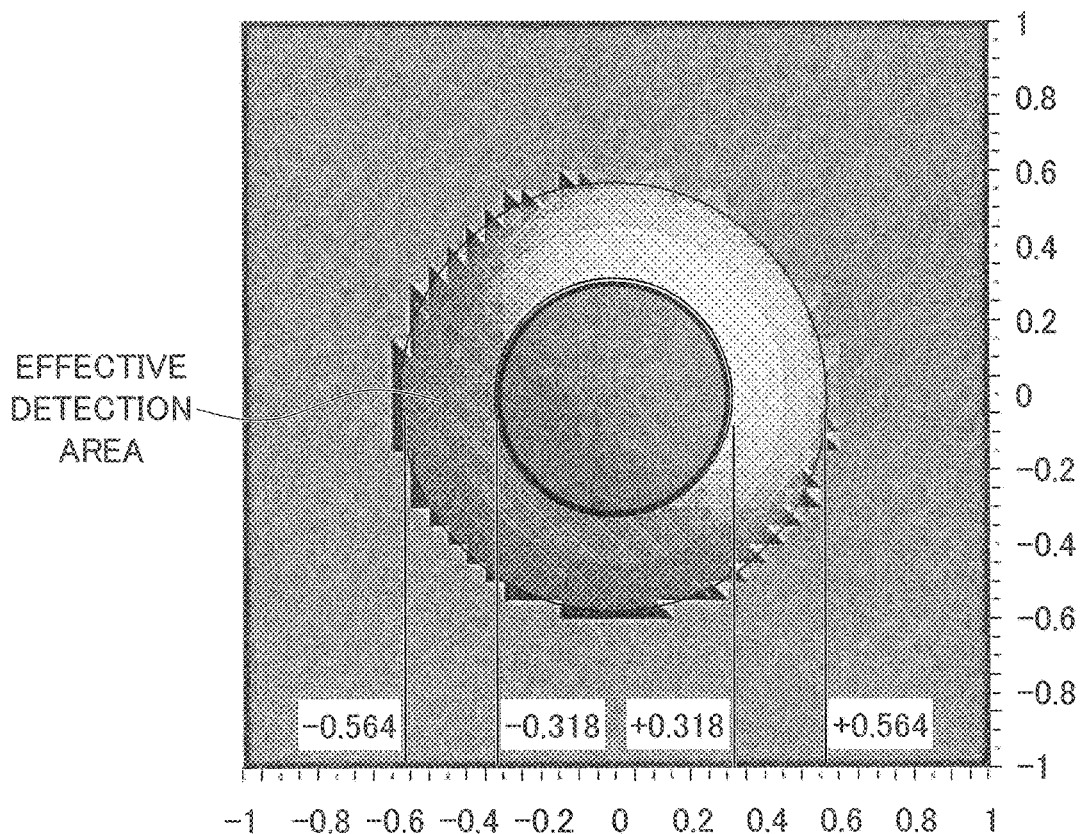

FIGS. 8A through 8C are images and numerical data of a spheroid according to an embodiment. FIG. 8A is a three-dimensional image of the spheroid with an eccentricity of 0.826 and formed of a material having a refractive index of 1.57. FIG. 8B is a top view of the spheroid illustrated in FIG. 8A. FIG. 8C illustrates numerical data of the spheroid. FIG. 8A and FIG. 8B illustrate the spheroid when the semi-major axis is normalized to 1. FIG. 8C illustrates numerical data when the major axis is normalized to 1, and also illustrates, as an example, numerical data when the major axis is normalized to 30 mm.

When the horizontal axis and the vertical axis of FIG. 8B are represented by xy coordinates, a doughnut-shaped area expressed by the following formula is the effective detection area.

$$0.318^2 < x^2 + y^2 < 0.564^2$$

The optical cover 11 of the rain sensor according to the embodiment can efficiently detect adhesion of raindrops by setting the eccentricity in accordance with the refractive index of a material of the optical cover 11 and the required size of the effective detection area.

<First Variation>

Figure 9A:
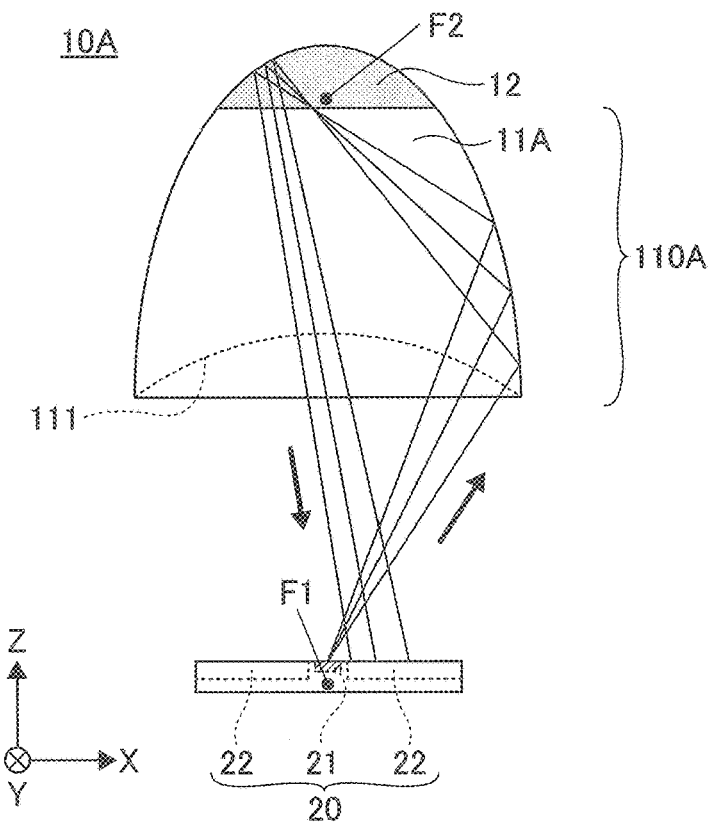
FIGS. 9A and 9B are diagrams illustrating a rain sensor according to a first variation.
Figure 9B:
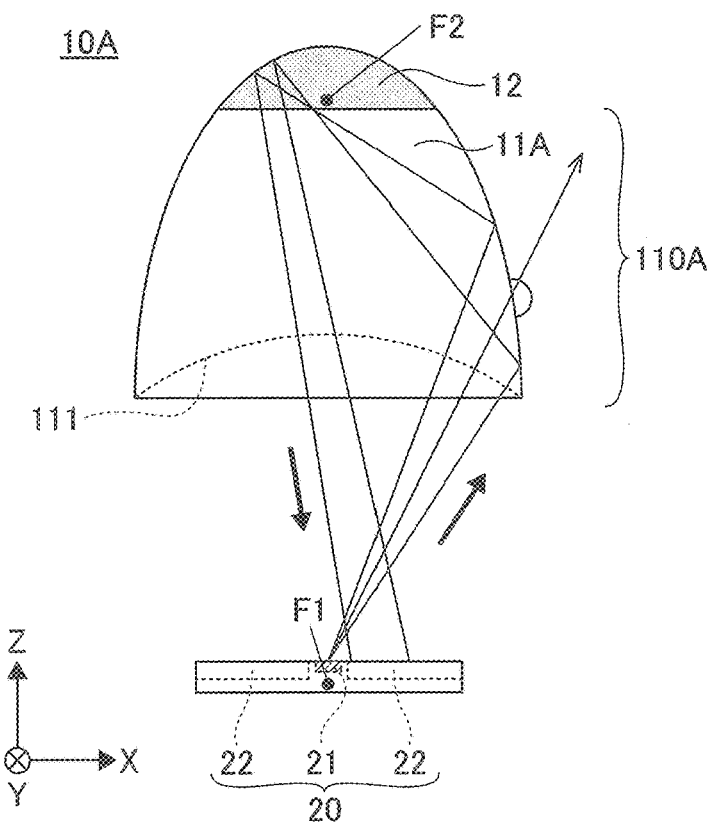

FIGS. 9A and 9B are diagrams illustrating a rain sensor 10A according to a first variation. The rain sensor 10A includes an optical cover 11A that forms the upper half of a spheroid in the Z-direction. Generally, considering the adhesion direction of raindrops and the shape of a spheroid, the upper half of the spheroid is used as a sensor. An area between the lower end of the optical cover 11A and the reflector 12 is an effective detection area 110A.

In the configuration of FIGS. 9A and 9B, the light emitting and receiving device 20 is provided in the vicinity of the first focal point F1 of the spheroid. The optical cover 11A may be supported above the light emitting and receiving device 20 by an appropriate support member such as a frame or a support column.

In the configuration of FIGS. 9A and 9B, light emitted from the light emitting element 21 is incident on the optical cover 11A via an air space. In this case, an interface between the optical cover 11A and air would be affected by refraction. Therefore, the bottom surface (spherical surface 111) of the optical cover 11A is cut by a sphere whose center is the first focal point F1 or a point on a straight line connecting the first focal point F1 to the light emitting element 21. By cutting the bottom surface by a sphere whose center is the first focal point F1 or a point on a straight line connecting the first focal point F1 to the light emitting element 21, the influence of refraction can be minimized at the interface between the optical cover 11A and the air space. Further, a space between the optical cover 11A and the light emitting and receiving device 20 is not required to be filled with a material, such as polycarbonate, having a refractive index equivalent to that of the optical cover 11A. Accordingly, a manufacturing process can be simplified.

As illustrated in FIG. 9A, when no raindrops adhere to the rain sensor 10A, light emitted from the light emitting element 21 enters from the bottom surface side of the optical cover 11A, is totally reflected by the effective detection area 110A, and is reflected by the reflector 12 again. Alternatively, light directly incident on the reflector 12 from the bottom surface side of the optical cover 11A is reflected by the reflector 12, and is then totally reflected by the effective detection area 110A. In both cases, at least part of the light emitted from the bottom surface side of the optical cover 11A is received by the light emitting and receiving device 20.

The bottom surface of the optical cover 11A is the spherical surface 111 whose center is the first focal point F1 or a point on a straight line connecting the light emitting element 21 to the first focal point F1. Thus, emitted light enters the spherical surface 111 approximately vertically, with little influence of refraction. Further, light returning from the reflector 12 enters the air approximately vertically from the spherical surface 111, and thus, the light enters the light receiving element 22 with little influence of refraction.

As illustrated in FIG. 9B, when a raindrop adheres to the rain sensor 10A, light incident on the optical cover 11A from the air space, or light reflected by the reflector 12 towards the effective detection area 110A is not totally reflected at the position to which the raindrop adheres, and most of the light is transmitted. The amount of light received by the light receiving element 22 decreases in accordance with the amount of light transmitted. The spherical surface 111 of the optical cover 11A is little affected by refraction in this case as well, and thus, light returning from the reflector 12 can be efficiently directed towards the light receiving surface.

<Second Variation>

Figure 10A:
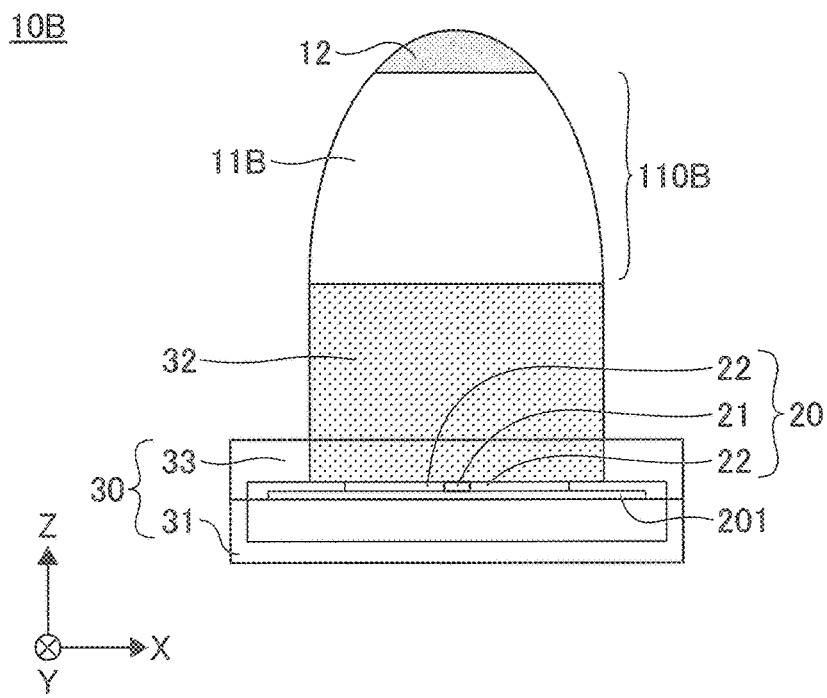
FIGS. 10A and 10B are diagrams illustrating a rain sensor according to a second variation.
Figure 10B:
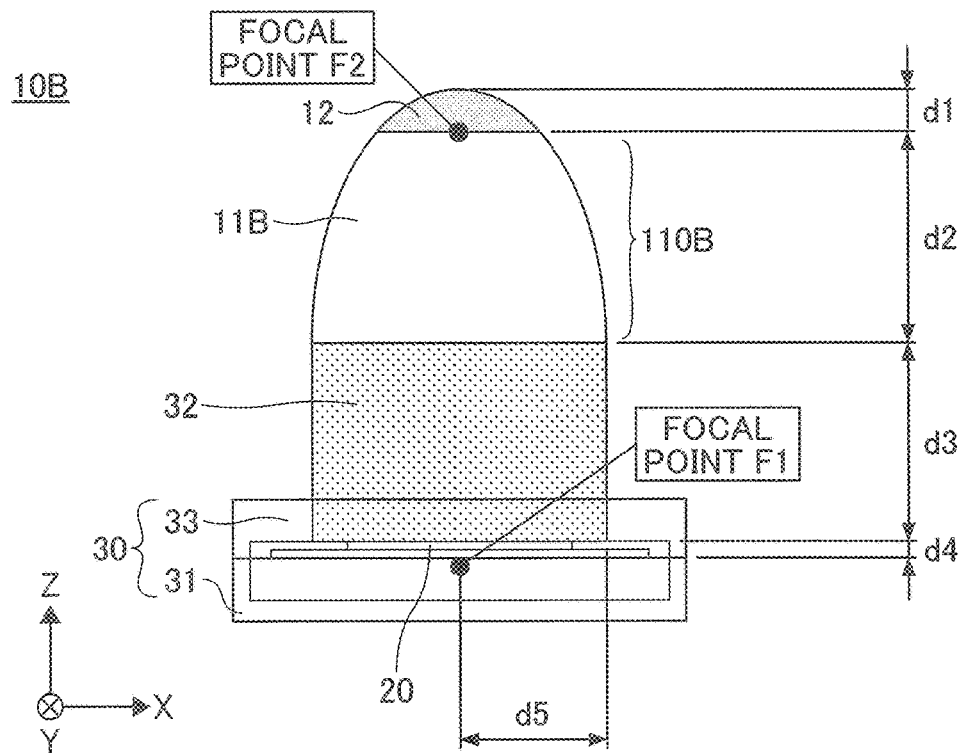

FIGS. 10A and 10B are diagrams illustrating a rain sensor 10B according to a second variation. In FIG. 10A, the rain sensor 10B includes an optical cover 11B that forms part of a spheroid, the light emitting and receiving device 20 provided in the vicinity of the first focal point F1 of the spheroid, and the reflector 12 provided in the vicinity of the top of the spheroid.

The optical cover 11B is a solid cover that has a shape combining part of the spheroid with a cylinder. The optical cover 11B includes three areas that are the reflector 12 provided in the vicinity of the top, an effective detection area 110B, which is the curved surface of the spheroid, and a coating portion 32 formed of a light absorbing material or a light scattering material. It should be noted that, instead of using the light absorbing material and the light scattering material, the coating portion 32 may be subjected to sand blasting and may serve as a light scattering surface. Similar to the first variation of FIGS. 9A and 9B, the upper half of the spheroid in the Z-direction is used as the effective detection area 110B.

The reflector 12 reflects light, emitted from the light emitting element 21 and totally reflected by the effective detection area 110B, towards the light receiving surface of the light emitting and receiving device 20. Alternatively, the reflector 12 reflects at least components of light, directly incident on the reflector 12 from the light emitting element 21, towards the effective detection area 110B. The sensitivity of the rain sensor 10B improves by efficiently directing components of light, contributing to detection of raindrops, towards the light receiving surface.

When no water drop is attached, the effective detection area 110B totally reflects light emitted from the light emitting element 21 or light reflected from the reflector 12. When a water drop is attached, the effective detection area 110B transmits most of the light (90% or more of the light, for example).

The coating portion 32 is a cylindrical portion located below the effective detection area 110B of the optical cover 11B, and a coating is applied to the surface of the cylindrical portion.

If the light absorbing material is applied to the coating portion 32, the coating portion 32 absorbs light directly incident on the coating portion 32 from the light emitting element 21, and also absorbs light incident on the coating portion 32 after having been reflected by the reflector 12. If the coating portion 32 serves as the light scattering surface, the coating portion 32 scatters light directly incident on the coating portion 32 from the light emitting element 21, and also scatters light incident on the coating portion 32 after having been reflected by the reflector 12. It should be noted that, instead of using the light absorbing material and the light scattering material, the coating portion 32 may be subjected to sand blasting and may serve as the light scattering surface.

If the coating portion 32 serves as the light scattering surface, part of scattered light may be incident on the light receiving element 22. Therefore, in this case, the degree of scattering of the light scattering surface is measured, and a DC offset is applied to the light emitting and receiving device 20 in advance. Alternatively, values immediately before measurement are compared to values during actual measurement. In this manner, it becomes possible to accurately detect adhesion of raindrops.

In an assembled state, the light emitting and receiving device 20 is housed within a bottom cover 31. The bottom cover 31 includes a rim 33 that fits the bottom cover 31 and that also serves as a top cover. After assembly, the bottom cover 31 and the rim 33 form a base 30 of the rain sensor 10B.

FIG. 10B is a diagram illustrating shape parameters of the rain sensor 10B. As an example, the optical cover 11B forms the upper half, in the Z-direction, of a spheroid having a semi-major axis (d1+d2) of 30 mm and a semi-minor axis (d5) of 16.9 mm. The reflector 12 extends from the top along the major axis by d1 (d1=5.2 mm). The coating portion 32 has a height d3 of 23 mm.

As will be described later, in the rain sensor 10B having the above-described parameters, components of light, emitted from the light emitting element 21 within a predetermined angular range, are directly incident on the effective detection area 110B or incident on the effective detection area 110B after having been reflected by the reflector 12, thereby contributing to detection of raindrops.

Figure 11:
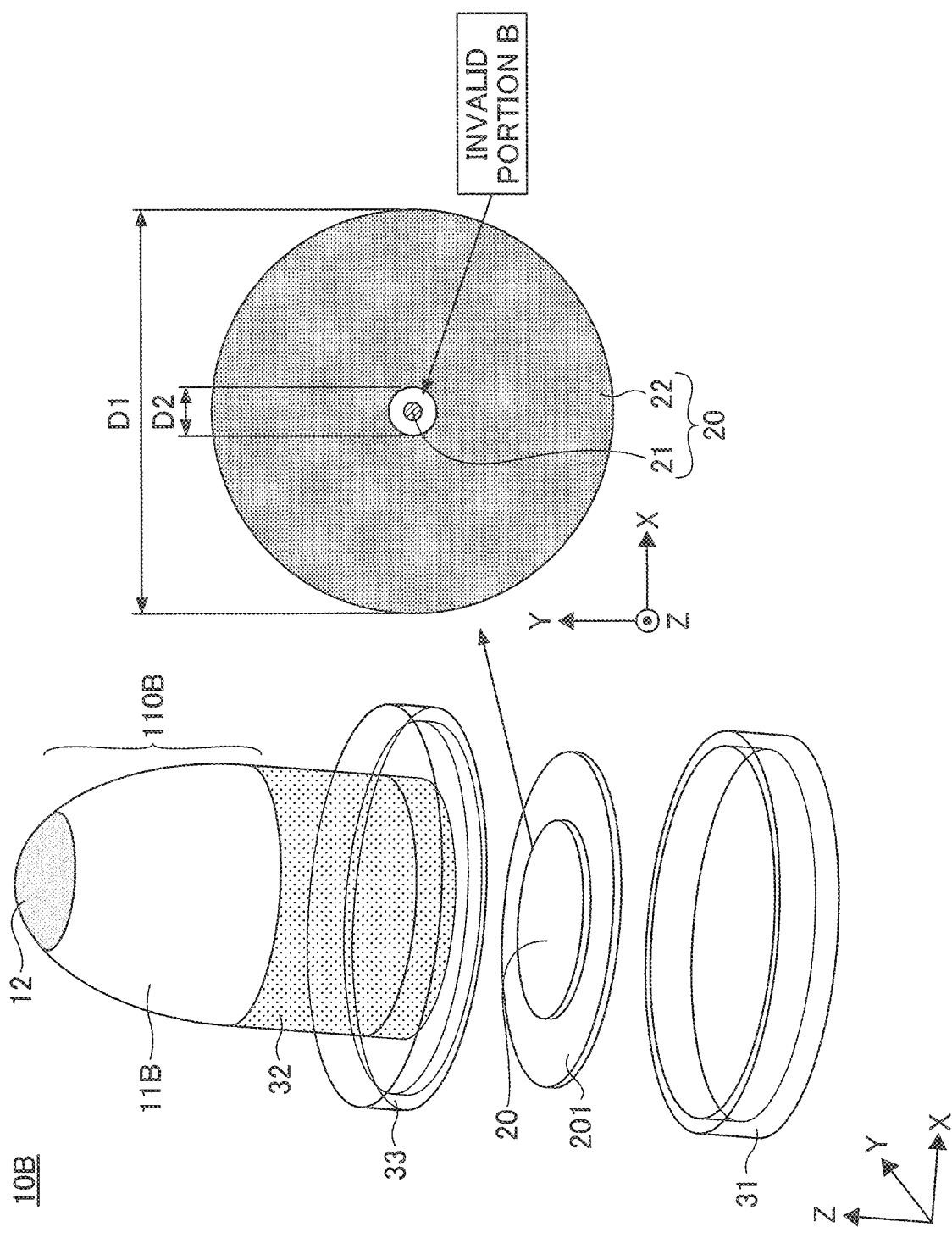
FIG. 11 is a diagram illustrating an insensitive area (invalid portion) of the light emitting and receiving device.

FIG. 11 is a diagram illustrating an insensitive area of the light emitting and receiving device 20. The light emitting and receiving device 20 is an integrated element in which the light emitting element 21 and the light receiving element 22 are formed as one chip. The light emitting element 21 and the light receiving element 22 may be formed on the same plane, or the light emitting element 21 may be disposed on a layer higher than the light receiving element 22 so as to approach the center of the spheroid. The light emitting and receiving device 20 is integrated into the substrate 201 together with other electronic components, and is provided at the bottom surface of the optical cover 11B.

The light emitting element 21 may be a light-emitting diode (LED) at infrared wavelengths, and corresponds to a point light source. The light receiving element 22 may be a photodiode (PD), and may form a doughnut-shaped light receiving area having a diameter D1. The diameter D1 may be 20 mm. The diameter of the substrate 201 may be 33.8 mm. The diameter of the light emitting and receiving device 20 may be set to approximately 60% of the diameter of the substrate 201. There is an invalid portion B surrounding the point light source. Preferably, the invalid portion B has a diameter D2 as small as possible. However, when the light emitting element 21 and the light receiving element 22 are formed as one chip, it is not possible to set the diameter D2 to zero. As an example, the diameter D2 may be $0<D2\leq1$ mm.

FIGS. 12A through 12F are diagrams illustrating relationships between light emission angles and light receiving states of a rain sensor formed by using the parameters of FIG. 10B. The diameter D1 of the light receiving area is set to 20 mm, and the diameter of the invalid portion B is set to 1 mm. The top panels of FIGS. 12A through 12F indicate light emission angles of the LED (the angles from the normal line of the substrate), the second panels indicate optical paths, the third panels indicate images of the PD when no water drop is attached, and the fourth panels indicate descriptions of light receiving states.

Figure 12A:
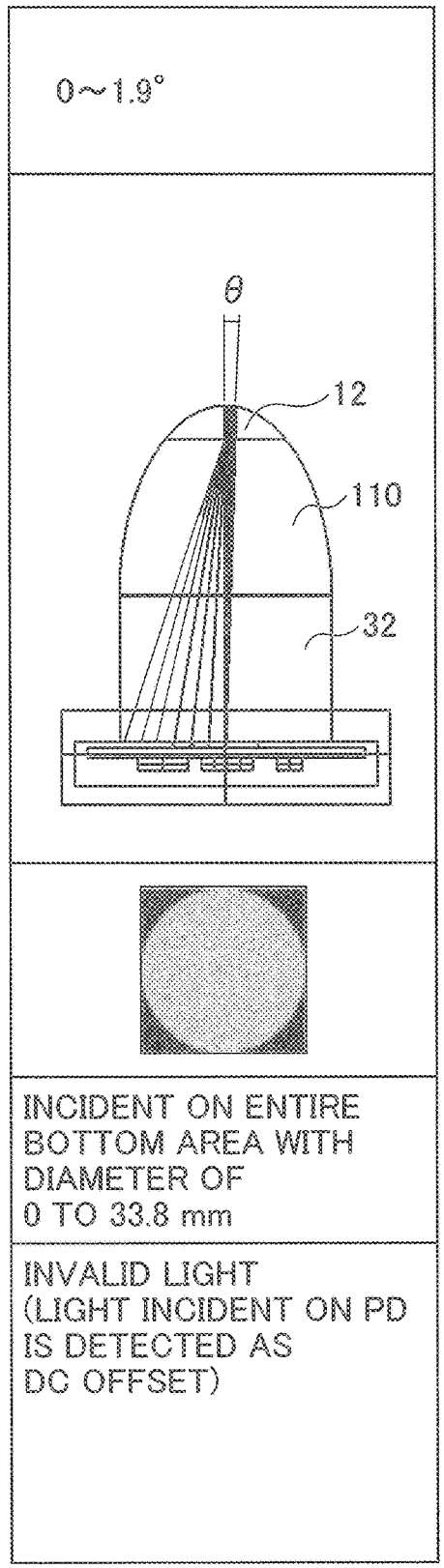
FIGS. 12A through 12F are diagrams illustrating relationships between light emission angles and light receiving states.
Figure 12B:
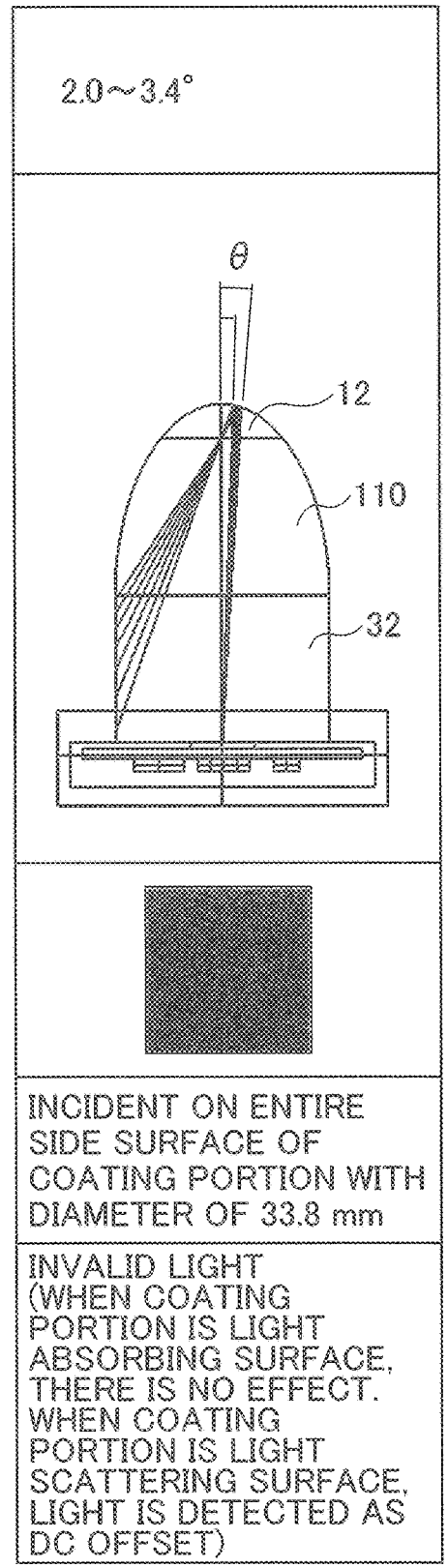
Figure 12C:
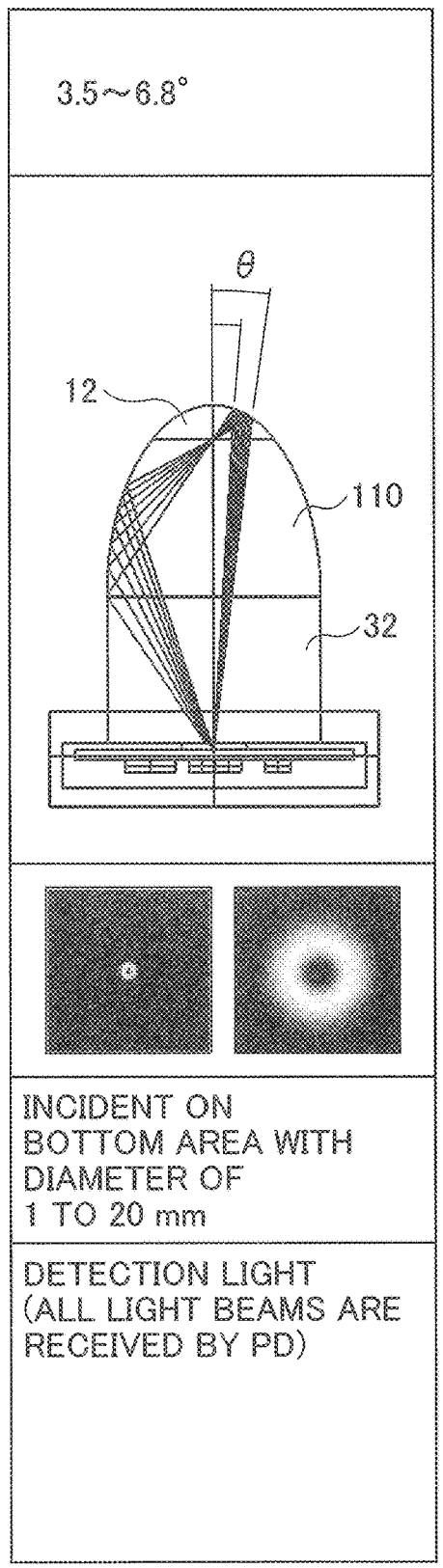
Figure 12D:
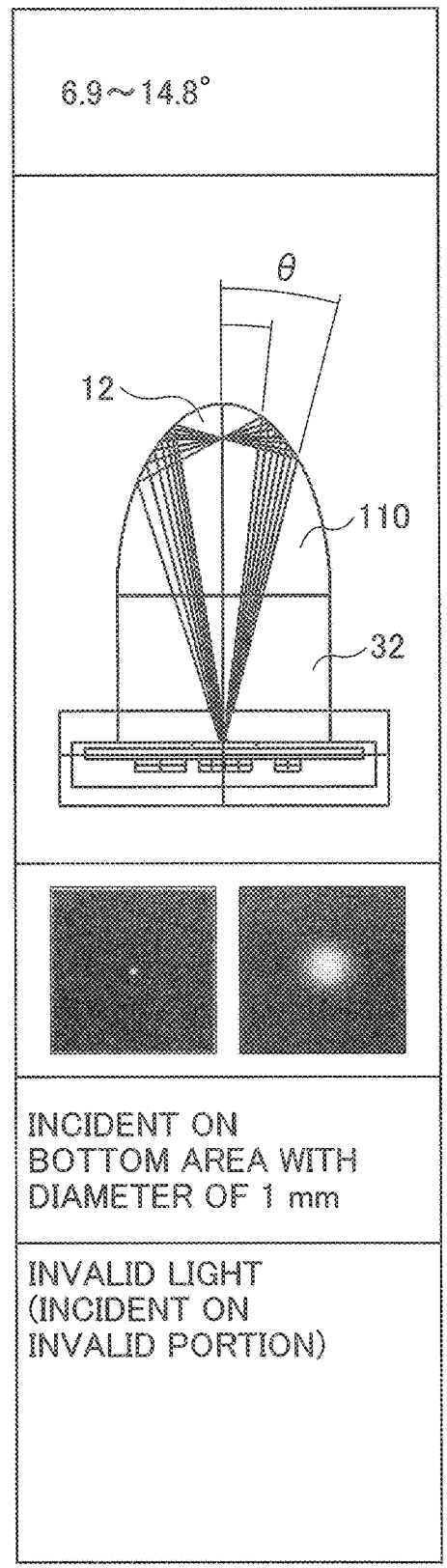
Figure 12E:
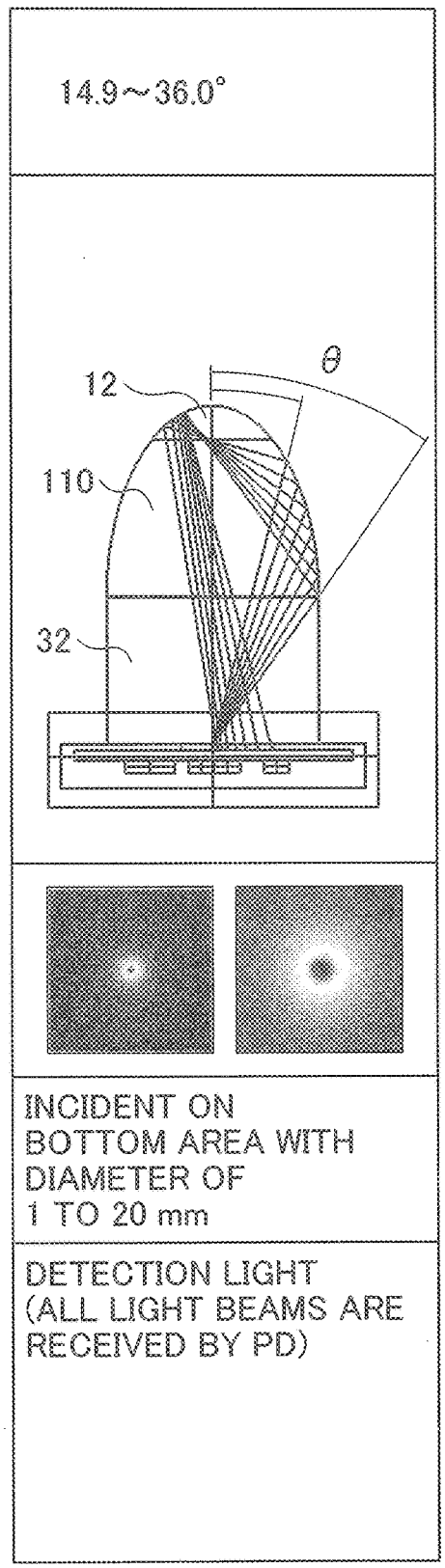
Figure 12F:
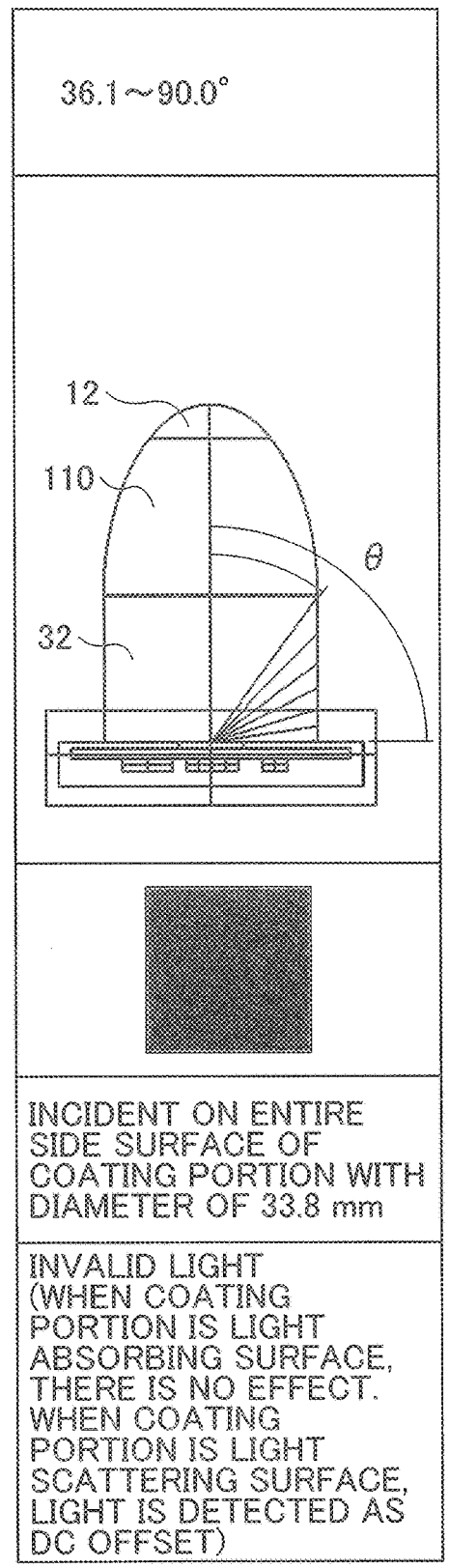

FIG. 12A illustrates a light receiving state when an emission angle is 0 to 1.9°, FIG. 12B illustrates a light receiving state when an emission angle is 2.0 to 3.4°, FIG. 12C illustrates a light receiving state when an emission angle is 3.5 to 6.8°, FIG. 12D illustrates a light receiving state when an emission angle is 6.9 to 14.8°, FIG. 12E illustrates a light receiving state when an emission angle is 14.9 to 36.0°, and FIG. 12F illustrates a light receiving state when an emission angle is 36.1 to 90.0°. FIGS. 13A through 18B illustrate enlarged diagrams illustrating the optical paths and the images of FIGS. 12A through 12F.

Figure 13A:
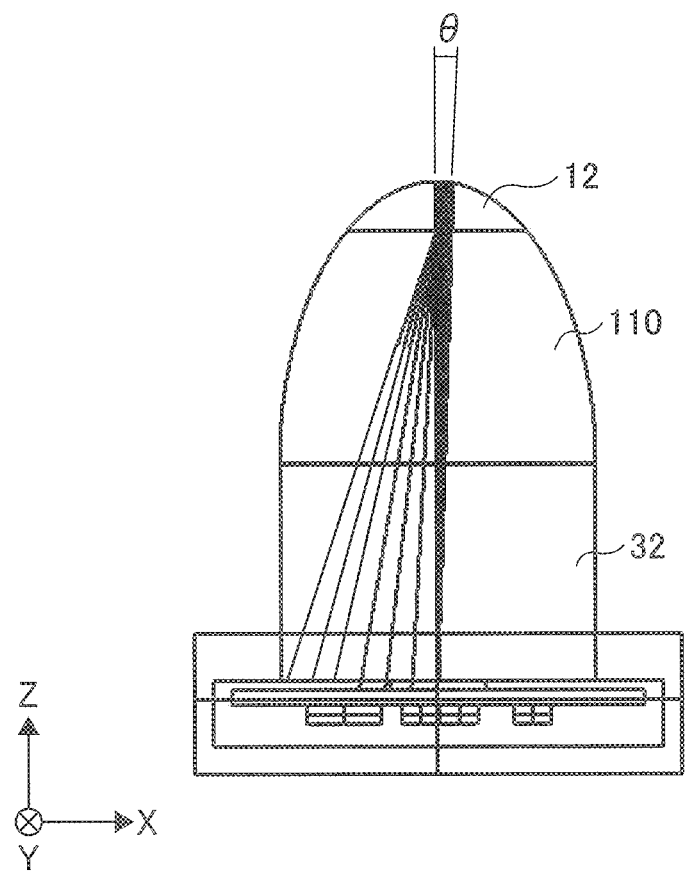
FIGS. 13A and 13B are diagrams illustrating optical paths of light components emitted at an angle of 0 to 1.9°.
Figure 13B:
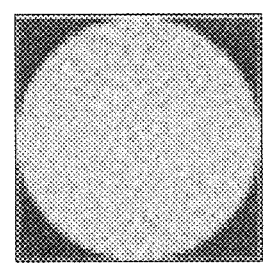

In FIG. 12A and FIGS. 13A and 13B, when the emission angle is 0 to 1.9°, light emitted from the LED is reflected by the reflector 12, and is incident on the substrate 201 provided at the bottom surface of the cylinder-shaped coating portion 32. In this case, the light is regarded as invalid light and is not used as detection light. In addition, light incident on the light receiving element 22 (or the PD) of the substrate 201 is detected as a DC offset. In the image, blurred light covering the entire substrate 201 is observed. This is because light reflected by the reflector 12 is diffused over a wide range and becomes pale light, and the pale light reaches the entire light receiving element 22. The light is incident on the 33.8-mm-diameter substrate 201. Further, light incident on the 20-mm-diameter light receiving element 22 is detected as a DC offset.

Figure 14A:
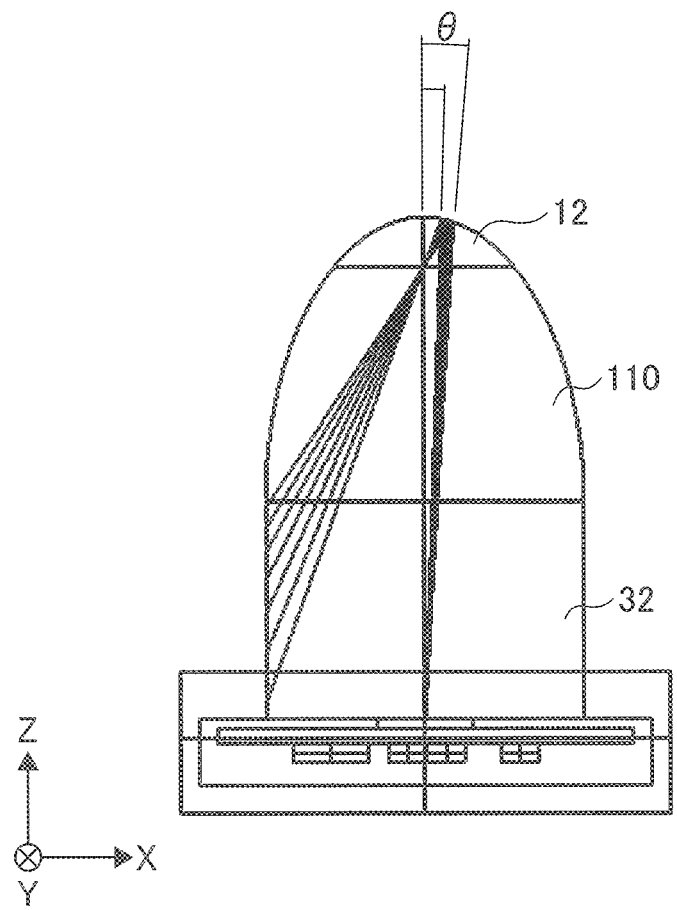
FIGS. 14A and 14B are diagrams illustrating optical paths of light components emitted at an angle of 2.0 to 3.4°.
Figure 14B:
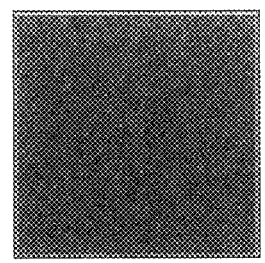

In FIG. 12B and FIGS. 14A and 14B, when the emission angle is 2.0 to 3.4°, light emitted from the LED is reflected by the reflector 12, and is incident on the entire side surface of the cylinder-shaped coating portion 32 with the diameter of 33.8 mm. If the coating portion 32 is the light absorbing surface, light is absorbed (invalid light), and sensing is not affected. If the coating portion 32 is the light scattering surface, light incident on the PD is detected as a DC offset. In the image, the distribution of light intensity in the light receiving area is not observed.

Figure 15A:
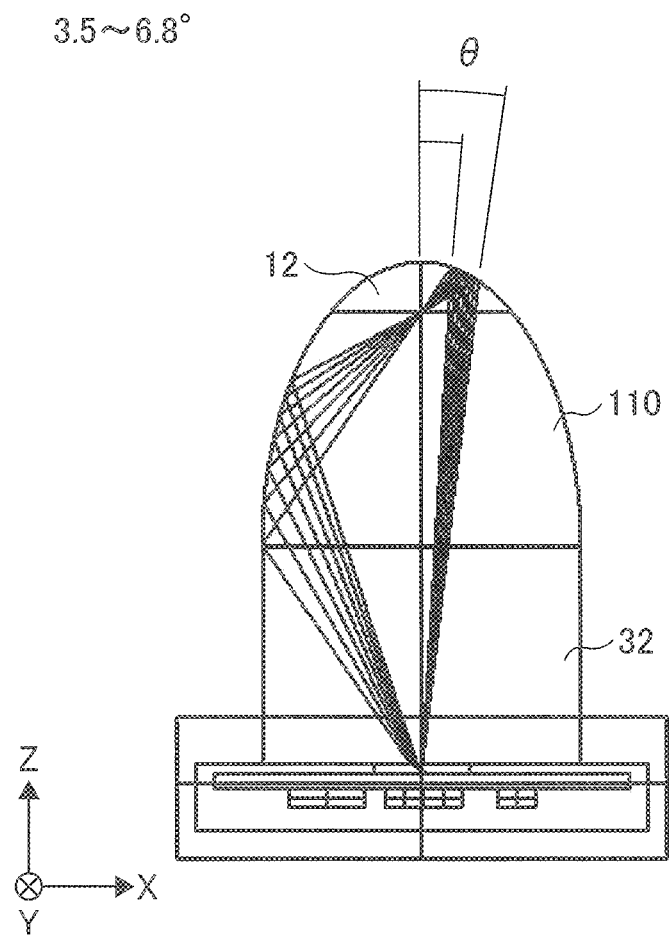
FIGS. 15A and 15B are diagrams illustrating optical paths of light components emitted at an angle of 3.5 to 6.8°.
Figure 15B:
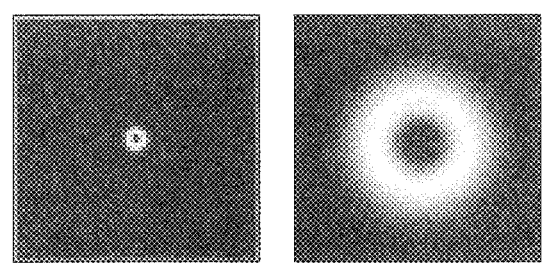

In FIG. 12C and FIGS. 15A and 15B, when the emission angle is 3.5 to 6.8°, light emitted from the LED is reflected by the reflector 12, is totally reflected by the effective detection area 110, and is received by the doughnut-shaped light receiving area of FIG. 11. In this case, all incident light beams are detected by the PD as detection light, and no light is incident on the invalid portion B. Of the received light images, the image on the right is an enlarged image of the image on the left. The doughnut-shaped, high intensity area is the light receiving area. The incident light enters the 20-mm-diameter light receiving element, except for the 1-mm diameter invalid portion B (see FIG. 11), of the light emitting and receiving device 20.

Figure 16A:
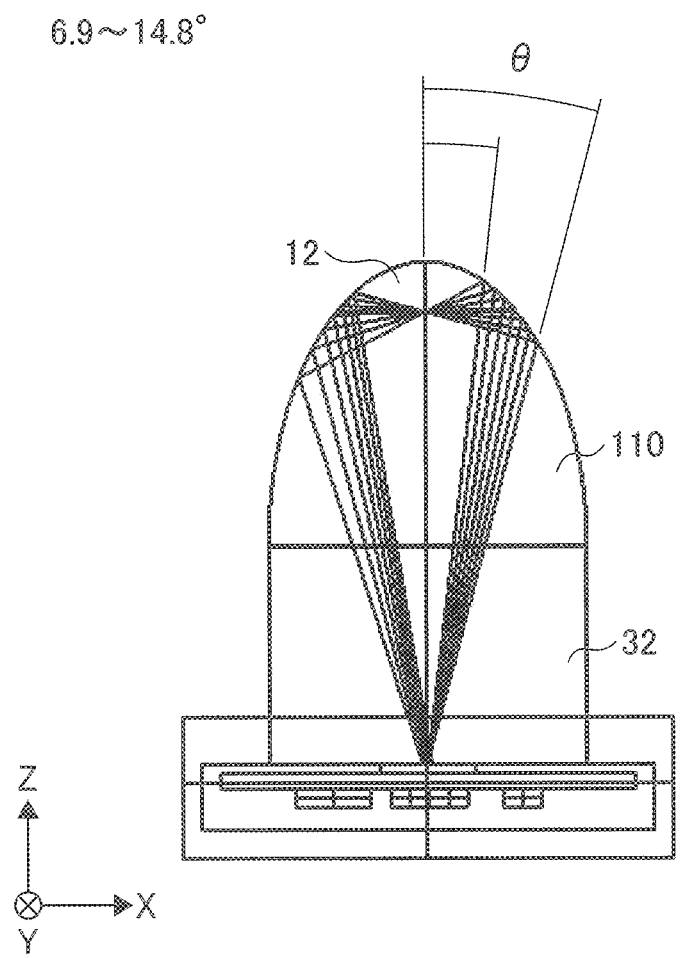
FIGS. 16A and 16B are diagrams illustrating optical paths of light components emitted at an angle of 6.9 to 14.8°.
Figure 16B:
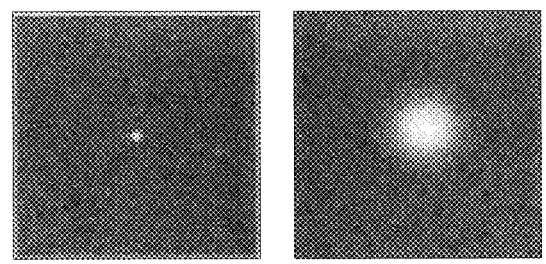

In FIG. 12D and FIGS. 16A and 16B, when the emission angle is 6.9 to 14.8°, light emitted from the LED is reflected by the reflector 12, is totally reflected by the effective detection area 110, and is incident on the invalid portion B on the substrate 201. Alternatively, light emitted from the LED is totally reflected by the effective detection area 110, is reflected by the reflector 12, and is incident on the invalid portion B on the substrate 201. In this case, all incident light beams are focused on the invalid portion B, and in the images, blurred light focused on the center is observed. The diameter of the invalid portion B is 1 mm. In the above case, a part of the effective detection area 110 becomes a non-detection area, and thus, light reflected by the effective detection area 110 is incident on the invalid portion B. This is because there is some distance between the focal point F1 and the light emitting/receiving position, and by decreasing the distance, the effective detection area can be further increased (however, if the focal point F1 and the light emitting/receiving position are located at the same position, light would return to the original position. Therefore, it is required to dispose the focal point and the light emitting/receiving position slightly apart from each other).

Figure 17A:
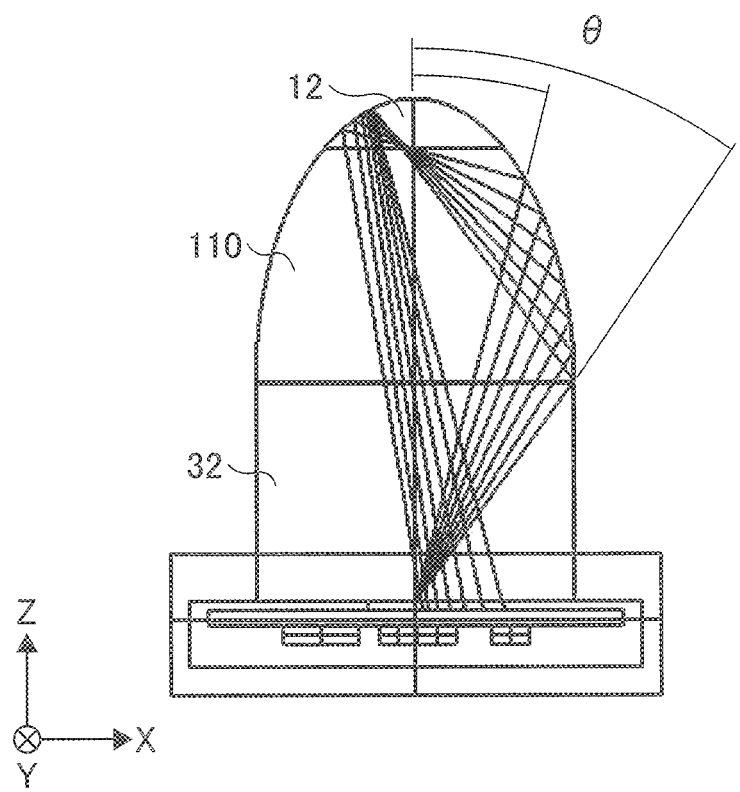
FIGS. 17A and 17B are diagrams illustrating optical paths of light components emitted at an angle of 14.9 to 36°.
Figure 17B:
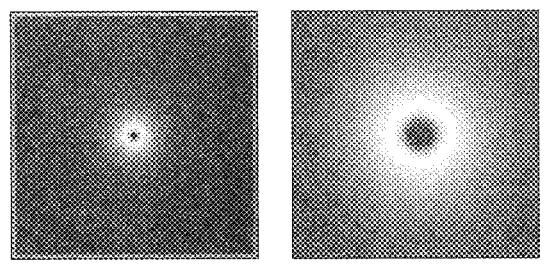

In FIG. 12E and FIGS. 17A and 17B, when the emission angle is 14.9 to 36.0°, light emitted from the LED is totally reflected by the effective detection area 110, is reflected by the reflector 12, and is received by the doughnut-shaped light receiving area (the PD area). In this case, the doughnut-shaped intensity distribution of all light beams is observed. The incident light enters the 20-mm-diameter light receiving element, except for the 1-mm diameter invalid portion B, of the light emitting and receiving device 20.

Figure 18A:
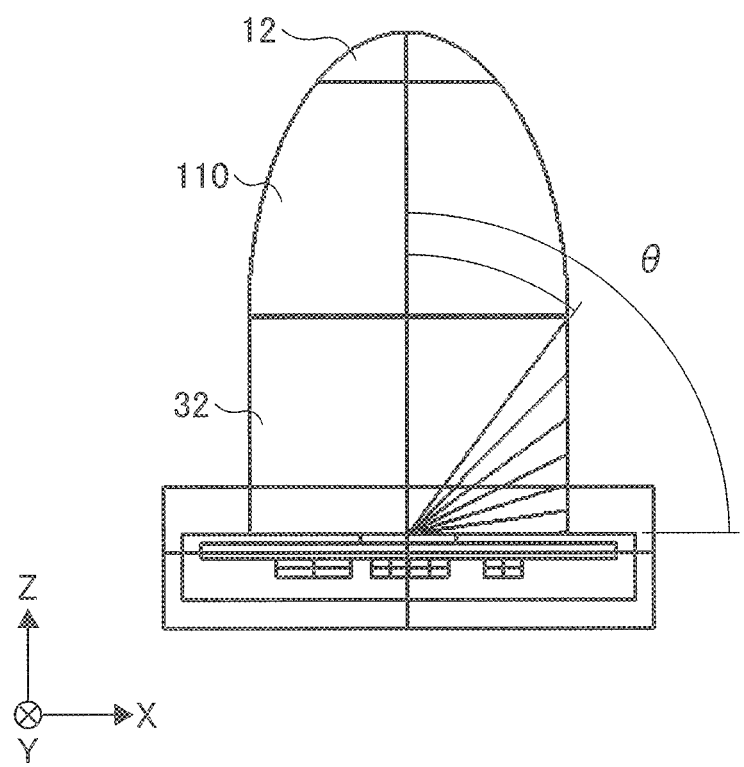
FIGS. 18A and 18B are diagrams illustrating optical paths of light components emitted at an angle of 36.1 to 90.0°.
Figure 18B:
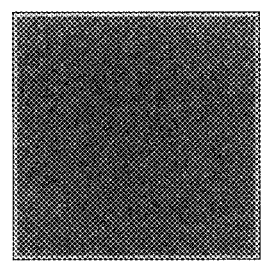

In FIG. 12F and FIGS. 18A and 18B, when the emission angle is 36.1 to 90.0°, light emitted from the LED is incident on the entire side surface of the cylinder-shaped coating portion 32 with the diameter of 33.8 mm. If the coating portion 32 is the light absorbing surface, light is absorbed, and sensing is not affected. If the coating portion 32 is the light scattering surface, light incident on the PD is detected as a DC offset.

Light emitted from the light emitting element 21 includes light components as illustrated in FIGS. 12A through 12F, and optical paths differ in accordance with the emission angles. As described above, by decreasing the distance between the focal point F1 and the light emitting element 21, it is possible to decrease the diameter of the invalid portion B, thereby widening light emission angle range in which detection light can be obtained.

<Third Variation>

Figure 19B:
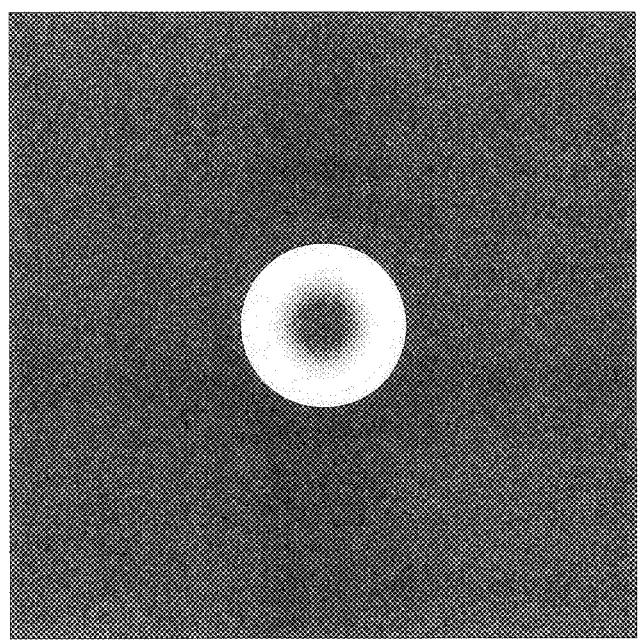
FIGS. 19A and 19B are diagrams illustrating intensity distribution of light incident on an effective detection area of a rain sensor according to a third variation.
Figure 19A:
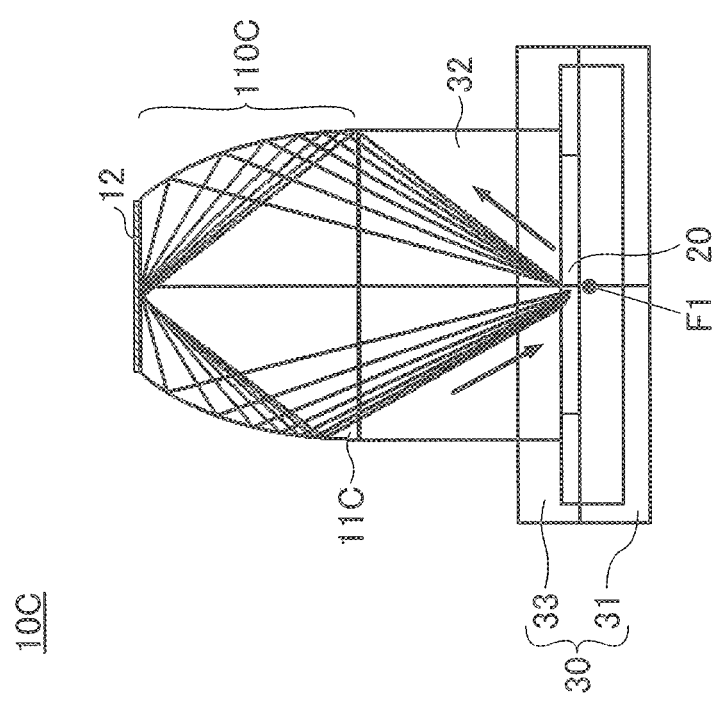

FIGS. 19A and 19B illustrate a configuration of a rain sensor 10C according to a third variation. FIG. 19A is a schematic view of the rain sensor 10C. FIG. 19B illustrates intensity distribution of light incident on a light receiving element. The rain sensor 10C includes an optical cover 11C that forms part of a spheroid, a light emitting and receiving device 20 provided in the vicinity of one focal point of the spheroid, and a reflector 12 provided at the upper end of the optical cover 11C. A mirror coating may be applied to the reflector 12. Alternatively, the reflector 12 may have any surface shape that satisfies the total internal reflection conditions without a mirror coating.

At the other focal point of the spheroid or in the vicinity of the other focal point, the upper end of the optical cover 11C is cut by a plane (X-Y plane in FIG. 12) perpendicular to the major axis or by a plane that satisfies the total internal reflection conditions. The reflector 12 is formed on the cut surface.

The curved surface of the spheroid is an effective detection area 110C. A coating for absorption or scattering is applied to a coating portion 32, which is a cylindrical portion located below the effective detection area 110C.

The light emitting and receiving device 20 is disposed at a position offset from the first focal point F1 of the spheroid along the major axis. The optical cover 11C includes a rim 33 that fits a bottom cover 31 and that also serves as a top cover. After assembly, the bottom cover 31 and the rim 33 form a base 30 of the rain sensor 100.

Light in a doughnut shape is focused on an area except for the center of the light receiving element. In the examples of FIGS. 19A and 19B, adhesion of water drops can be detected with high sensitivity, based on patterns in accordance with light emission angles of the light emitting element 21 as described in FIG. 12A through 18B.

<Other Variation>

Figure 20:
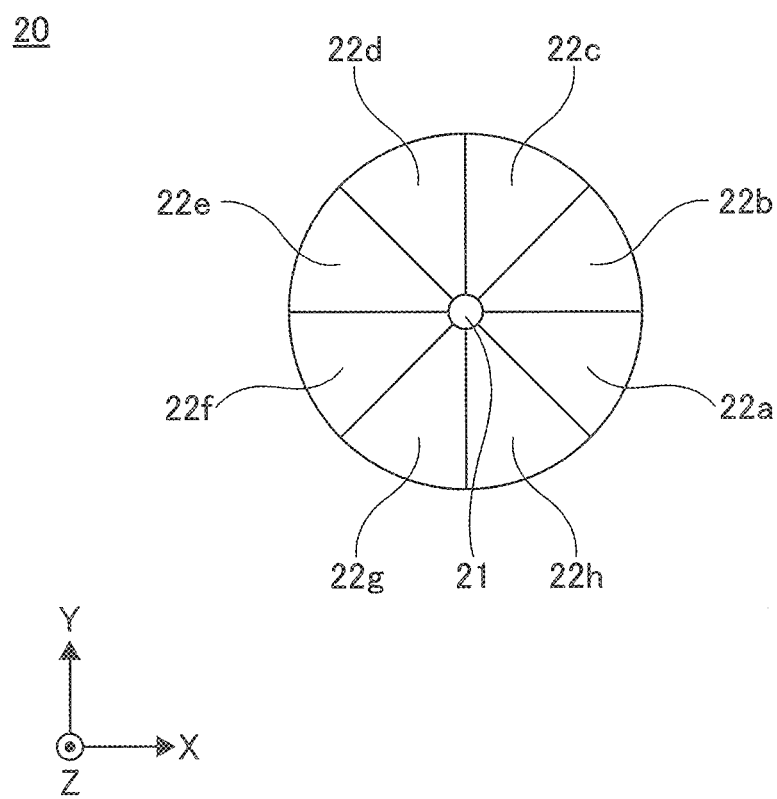
FIG. 20 is a diagram illustrating a variation of the light emitting and receiving device.

FIG. 20 illustrates a variation of the light emitting and receiving device 20. The light receiving element 22 may have a plurality of light receiving areas 22a through 22h, and may detect light that has been totally reflected by an effective detection area. In the example of FIG. 20, the light receiving element 22 is radially divided into the plurality of light receiving areas; however, the light receiving element 22 may be concentrically divided into a plurality of light receiving areas.

Each of the divided light receiving areas 22a through 22h detects a signal (photoelectric current). Because each of the light receiving areas 22a through 22h detects the presence of raindrops in a corresponding area of the effective detection area, the wind direction can be also detected.

Figure 21A:
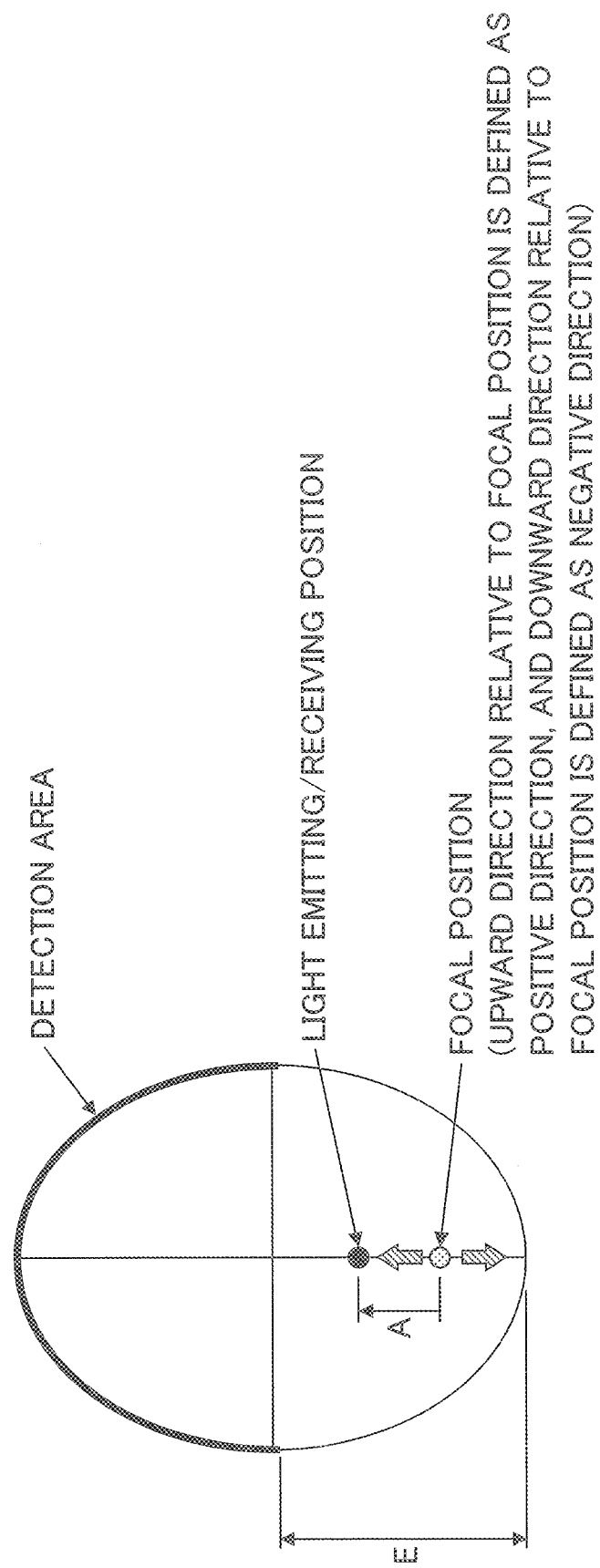
FIGS. 21A through 21C are diagrams illustrating a positional relationship between a focal point and the light emitting and receiving device.
Figures 21B, 21C:
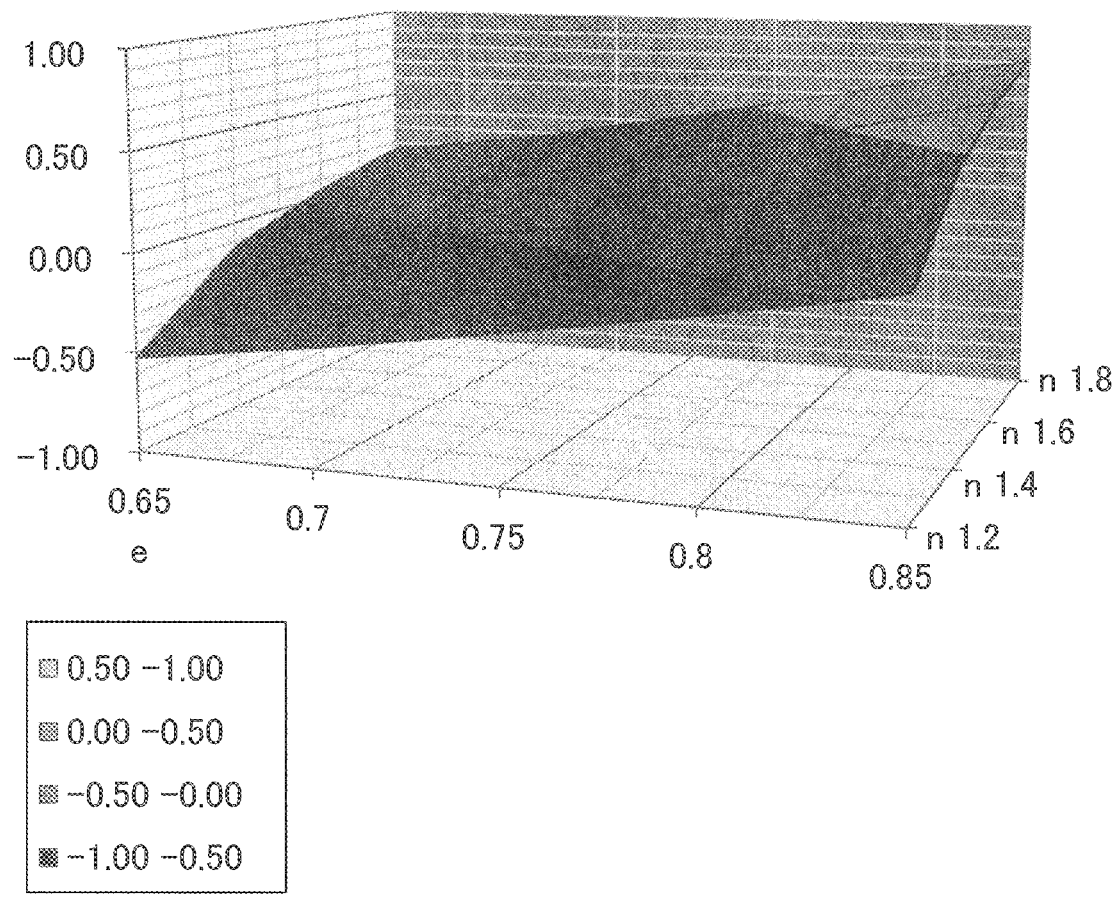

FIGS. 21A through 21C are diagrams illustrating a positional relationship between the focal point and the light emitting and receiving device 20. Under the condition that a detection area includes an area where raindrops can be detected, the distance by which the position of the light emitting and receiving device 20 can be moved from the focal point along the major axis of a spheroid is investigated. In FIG. 21A, the upper side of the vertically placed spheroid is the detection area, and the lower side is a non-detection area. A length of a semi-major axis E of the non-detection area of the spheroid is normalized to 1. In addition, a distance A represents the maximum distance from the position of the light emitting and receiving device 20 to the focal position in the major axis direction, which enables detection of raindrops within the detection area. An upward direction relative to the focal position is defined as a positive direction, and a downward direction relative to the focal position is defined as a negative direction.

FIG. 21B is a three-dimensional graph illustrating a relationship between a refractive index n of the spheroid, an eccentricity e of the spheroid, and the distance A from the light emitting and receiving device 20 to the focal point. The vertical axis perpendicular to the e-n plane represents the distance A. The upward direction relative to the focal position is the positive direction, and the downward direction relative to the focal position is the negative direction. The three-dimensional graph in FIG. 21B is created from the values listed in the table of FIG. 21C.

The eccentricity e is changed in the range of 0.65 to 0.85, and the refractive index n is changed in the range of 1.2 to 1.8. When the eccentricity e is 0.85 and the refractive index n is 1.8 (1.8±0.01 with error), the upper limit of the distance A is 0.81. Namely, when the semi-major axis of the spheroid is set to 1, the distance from the light emitting and receiving device 20 to the focal point at the lower side of the spheroid can be set to 0.81 or less (A≤0.81).

When the refractive index n is 1.8 and the eccentricity e is 0.85, the light emitting and receiving device 20, usable as a raindrop detection sensor, is located furthest from the focal point in the upward direction. Regardless of the refractive index n, as the eccentricity e decreases, the position of the light emitting and receiving device 20 moves downward. Similarly, regardless of the eccentricity e, as the refractive index n decreases, the position of the light emitting and receiving device 20 moves downward. When the refractive index n is 1.2 and the eccentricity e is 0.65, the light emitting and receiving device 20 is located furthest from the focal point in the downward direction.

According to at least one embodiment, a droplet sensor having a wide detection area and high sensitivity with a simple configuration is provided.

Although the present invention has been described with reference to specific embodiments, the present invention is not limited to the above-described embodiments. In the above-described configurations, a part of or the entirety of the effective detection area 110 may be coated with a water-repellent film. By coating the effective detection area 110 with the water-repellent film, a raindrop adhering to the effective detection area 110 can rapidly flow downward along the surface of the spheroid. Accordingly, when the next raindrop falls and adheres to the same position of the optical cover 11, it is possible to accurately detect a change between when the total internal reflection conditions are satisfied and when the total internal reflection conditions are not satisfied.

The first through third variations may be in any combination. For example, the first variation may be combined with the second variation. The lower end of the optical cover 11A having the spherical surface 111 as the bottom surface, centered on the light emitting element 21, may be held by a cylindrical support body, and the coating for absorption or scattering may be applied to the inner surface or the outer surface of the cylindrical support body. Light emitted from the light emitting element 21 and directly incident on the cylindrical support body and light reflected by the reflector 12 without passing through the effective detection area 110B may be absorbed or scattered. In addition, the reflector 12 may have a flat surface by combining the first variation and the third variation.

The droplet sensor according to the embodiments may be applied to a rain sensor, a dew condensation sensor, or any other sensor. For example, rain sensors may be used to measure local rainfall distribution and collect weather information by being placed on street trees or streetlights, or may be used to control wipers of vehicles. Dew condensation sensors may be used in office automation equipment such as copiers and servers. Further, a rain sensor may be incorporated into an environmental sensor and used in combination with other sensors (such as a temperature sensor and a wind direction/wind volume sensor).

Further, the present invention is not limited to these embodiments, and various variations and modifications may be made without departing from the scope of the present invention.

What is claimed is:

1. A droplet sensor comprising:
   an optical cover that forms part of a spheroid, a major axis of the spheroid being a vertical axis;
   a light emitting and receiving device disposed at a position offset from a first focal point of the spheroid along the major axis; and
   a reflector disposed in vicinity of a second focal point of the spheroid,
   wherein the light emitting and receiving device includes a light emitting element and a light receiving element;
   wherein both the light emitting element and the light receiving element are provided on a same side of the second focal point;
   wherein the light emitting and receiving device, and the reflector, are arranged along the path of the major axis;
   wherein the optical cover has an effective detection area between the light emitting and receiving device and the reflector,
   wherein the reflector is a non-detection area;
   wherein the effective detection area has a total internal reflection characteristic that (i) satisfies a total internal reflection condition at an interface with a gas, and (ii) does not satisfy the total internal reflection condition at an interface with a liquid,
   wherein the reflector reflects, towards a light receiving surface of the light emitting and receiving device, light totally reflected by the effective detection area, or reflects, towards the effective detection area, light directly incident on the reflector from the light emitting and receiving device;
   wherein the reflector does not have a total internal reflection characteristic that (i) satisfies the total internal reflection condition at the interface with the gas, and (ii) does not satisfy the total internal reflection condition at the interface with the liquid; and
   wherein the reflector is an area that reflects all light arriving from the effective detection area.

2. The droplet sensor according to claim 1, wherein the light emitting and receiving device is disposed on a plane perpendicular to the major axis, at a position closer to or farther from a center of the spheroid relative to the first focal point.

3. The droplet sensor according to claim 2, wherein a light emitting surface of the light emitting element and a light receiving surface of the light receiving element are disposed on the same plane.

4. The droplet sensor according to claim 2, wherein a light receiving element, and a light emitting surface of the light emitting element is disposed at a position closer to the center of the spheroid relative to a light receiving surface of the light receiving element.

5. The droplet sensor according to claim 1, wherein the reflector is a mirror surface provided in an area that includes a top of the spheroid.

6. The droplet sensor according to claim 1, wherein a surface of the optical cover is cut by a horizontal plane perpendicular to the major axis, the surface of the optical cover being in the vicinity of the second focal point, and the reflector is a mirror surface provided on the surface of the optical cover.

7. The droplet sensor according to claim 6, further comprising a coating portion disposed between the light emitting and receiving device and the effective detection area,
   wherein light directly incident on the coating portion from the light emitting and receiving device or light incident on the coating portion after having been reflected by the reflector is absorbed or scattered by the coating portion.

8. The droplet sensor according to claim 7, wherein, in a case where the coating portion is a scattering surface, a DC offset is applied to the light emitting and receiving device in accordance with a scattering characteristic of the coating portion.

9. The droplet sensor according to claim 1, wherein the optical cover is a solid object transparent to a wavelength of the light emitting and receiving device.

10. The droplet sensor according to claim 9, wherein a surface of the optical cover is cut by a sphere whose center is the first focal point or a point on a line connecting the first focal point to the light emitting and receiving device, the surface of the optical cover facing the light emitting and receiving device.

11. The droplet sensor according to claim 1 wherein a part of or entirety of the effective detection area is coated with a water-repellent film.

12. The droplet sensor according to claim 1, wherein the optical cover has a refractive index of 1.4 to 1.8, and the spheroid has an eccentricity of 0.7 to 0.85.

13. The droplet sensor according to claim 1, wherein the optical cover has a refractive index of 1.4±0.01, and the spheroid has an eccentricity of greater than 0.7.

14. The droplet sensor according to claim 1, wherein the optical cover has a refractive index of 1.6±0.01, and the spheroid has an eccentricity of greater than 0.6 and less than 0.95.

15. The droplet sensor according to claim 1, wherein the optical cover has a refractive index of 1.8±0.01, and the spheroid has an eccentricity of greater than 0.55 and less than 0.95.

16. The droplet sensor according to claim 1, wherein, in a case where a length of a semi-major axis of the spheroid is normalized to 1, the light emitting and receiving device is disposed at the position offset from the first focal point by a distance of 0.81 or less.

17. The droplet sensor according to claim 16, wherein the spheroid has an eccentricity of 0.85 or less.

18. The droplet sensor according to claim 16, wherein the optical cover has a refractive index of less than 1.8±0.01.

19. The droplet sensor according to claim 1, wherein light incident on the non-detection area is not detected by the light emitting and receiving device.

20. The droplet sensor according to claim 1, wherein the light emitting element, the light receiving element, and the reflector are arranged along the path of the major axis.

* * * * *